US009066252B2

(12) United States Patent
Liu

(10) Patent No.: US 9,066,252 B2
(45) Date of Patent: Jun. 23, 2015

(54) METHOD AND APPARATUS FOR TRANSMITTING BASEBAND SIGNALS

(71) Applicant: Huawei Technologies Co., Ltd., Shenzhen, Guangdong (CN)

(72) Inventor: Sheng Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 211 days.

(21) Appl. No.: 13/779,296

(22) Filed: Feb. 27, 2013

(65) Prior Publication Data

US 2013/0170353 A1  Jul. 4, 2013

Related U.S. Application Data

(63) Continuation of application No. PCT/CN2011/071418, filed on Mar. 1, 2011.

(30) Foreign Application Priority Data

Aug. 27, 2010  (CN) .......................... 2010 1 0264785

(51) Int. Cl.
  *H04W 28/02* (2009.01)
  *H04W 72/04* (2009.01)
  *H04W 88/08* (2009.01)
(52) U.S. Cl.
  CPC ...... *H04W 28/0289* (2013.01); *H04W 72/0486* (2013.01); *H04W 88/085* (2013.01)
(58) Field of Classification Search
  CPC .............. H04W 24/02; H04W 72/042; H04W 72/0453; H04W 88/08; H04W 88/085
  See application file for complete search history.

(56) References Cited

U.S. PATENT DOCUMENTS

2004/0096222 A1 *   5/2004   Cagenius ..................... 398/115
2007/0019679 A1 *   1/2007   Scheck et al. ................ 370/480
(Continued)

FOREIGN PATENT DOCUMENTS

CN       101141778 A     3/2008
WO    2005096648 A1    10/2005
(Continued)

OTHER PUBLICATIONS

Communication from a foreign counterpart application, International Application No. PCT/CN2011/071418, English Translation, International Search Report dated Jun. 9, 2011, 3 pages.
(Continued)

*Primary Examiner* — Yong Zhou
(74) *Attorney, Agent, or Firm* — Huawei Technologies Co., Ltd.

(57) ABSTRACT

A method for transmitting baseband signals is disclosed. The method includes: when downlink traffic volume in an area among areas covered by multiple remote radio frequency units RRUs is lower than a preset threshold, generating or receiving a group of downlink baseband signals, where the group of downlink baseband signals corresponds to all RRUs in the area; and transmitting the group of downlink baseband signals to each RRU in the area, so that each RRU generates downlink radio frequency signals based on the downlink baseband signals and sends the downlink radio frequency signals. Accordingly, the embodiments of the present invention further disclose a method for transmitting baseband signals and a BBU. With the technical solutions, the bandwidth for transmitting baseband signals is greatly lowered, implementation is easy, and complexity of a system is reduced.

14 Claims, 16 Drawing Sheets

(56) References Cited

U.S. PATENT DOCUMENTS

2008/0107014 A1* 5/2008 Huang et al. .................. 370/216
2008/0134194 A1* 6/2008 Liu .............................. 718/105
2009/0290632 A1 11/2009 Wegener

FOREIGN PATENT DOCUMENTS

| WO | 2005104576 A1 | 11/2005 |
| WO | 2009021359 A1 | 2/2009 |
| WO | 2009143176 A2 | 11/2009 |
| WO | 2009151893 A2 | 12/2009 |

OTHER PUBLICATIONS

Foreign Communication From a Counterpart Application, PCT Application PCT/CN2011/071418, English Translation of Written Opinion dated Jun. 9, 2011, 7 pages.

Foreign Communication From a Counterpart Application, European Application No. 11752814.1, Extended European Search Report dated Aug. 20, 2013, 7 pages.

Wang, Q., et al., "Application of BBU+RRU based CoMP System to LTE-Advanced," Wireless Theories and Technologies Lab, Beijing, China, XP031515467, Jun. 14, 2009, 5 pages.

* cited by examiner

METHOD AND APPARATUS FOR TRANSMITTING BASEBAND SIGNALS

CROSS-REFERENCE TO RELATED APPLICATIONS

This application is a continuation of International Application No. PCT/CN2011/071418, filed on Mar. 1, 2011 which claims priority to Chinese Patent Application No. 201010264785.5, filed on Aug. 27, 2010, both of which are hereby incorporated by reference in their entireties.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates to the communications field, and in particular, to a method and an apparatus for transmitting baseband signals.

BACKGROUND

Compared with a conventional macro base station, the system of a distributed base station is divided into a base band unit (BBU) and a remote radio frequency unit (RRU). The RRU is deployed at an access point far from the BBU. The RRU and the BBU are connected through an optical fiber, and baseband radio signals are transmitted there between in analog or digital mode. The distance between the BBU and the RRU generally ranges from dozens of meters to one or two hundred meters. In this way, network construction is more flexible and convenient, and antenna deployment is not affected by the location of an equipment room. In addition, a base station system can be designed with a large capacity and the cost of system construction may be reduced. A distributed antenna system (DAS) is similar to a distributed base station having an RRU. However, the distance between the BBU and the RRU may be extended to several hundreds of meters, or even to tens of hundreds of meters. In addition to using a direct optical fiber for connection, optical transmission technologies, such as the passive optical network (PON) and wave division multiplexing (WDM) may also be used for connection. Further, preferably a multi-cell joint processing manner, such as network multiple input and multiple output (MIMO), multi-cell joint scheduling, is used to reduce interference between cells and further increase a system capacity.

As 3rd generation (3G)/4th generation (4G) technologies, such as Long Term Evolution (LTE), emerge, the radio spectral width increases (20 MHz to 100 MHz). Meanwhile, an RRU generally supports multi-antenna technologies, such as MIMO. As such, the bandwidth required for transmitting baseband radio signals between the BBU and the RRU increases. For example, when LTE baseband in-phase/quadrature (I/Q) signals of 20 MHz bandwidth are transmitted by using a digital manner, the rate for transmitting baseband radio signals by each RRU is as high as 10 Gbit/s. Apparently, this imposes great challenges to transmission of baseband signals between the BBU and the RRU. Typically, a single BBU may be connected to dozens to hundreds of RRUs. This means that the baseband radio signal routing and switching unit of each BBU needs to route and switch dozens to hundreds of paths of radio signals whose transmission rates each is as high as 10 Gbit/s. This does not include data exchange between radio access processing modules. Apparently, this imposes great challenges to implementation of the BBU. When the cloud computing architecture cloud radio access network (C-RAN) is further used, a large number of high-speed baseband radio signals need to be transmitted and exchanged between BBUs, which imposes great challenges to design and reliable running of an entire C-RAN system. Therefore, it becomes crucial to effectively compress baseband radio signals, to lower the bandwidth requirement for transmitting baseband signals between the BBU and the RRU and reduce the complexity of the BBU and a C-RAN system in which multiple BBUs are interconnected. In the prior art, four manners are generally available to implementation of compression of baseband radio signals, that is, sampling rate reduction, non-linear quantization, intelligence quotient (IQ) data compression, and subcarrier compression.

All the four technologies for compressing baseband radio signals, however, face a common problem: Because the transmission rate of a baseband signal is extremely high, the four manners are highly complicated, and the performance may be greatly degraded.

SUMMARY

Embodiments of the present invention provide a method and an apparatus for transmitting baseband signals to lower the bandwidth for transmitting baseband signals and reduce complexity of a system.

An embodiment of the present invention provides a method for transmitting baseband signals. The method includes: when downlink traffic volume in an area among areas covered by multiple RRUs is lower than a preset threshold, generating or receiving a group of downlink baseband signals, where the group of downlink baseband signals corresponds to all RRUs in the area; and transmitting the group of downlink baseband signals to each RRU in the area, so that each RRU generates downlink radio frequency signals based on the downlink baseband signals and sends the downlink radio frequency signals.

An embodiment of the present invention discloses a method for transmitting baseband signals. The method includes: receiving uplink baseband signals transmitted by each RRU in an area among areas covered by corresponding multiple RRUs, where the uplink baseband signals transmitted by each RRU are obtained by converting received radio frequency signals by each RRU; and when uplink traffic volume in the area is lower than a preset threshold, combining the uplink baseband signals transmitted by each RRU in the area into one group of uplink baseband signals, where the group of uplink baseband signals corresponds to all RRUs in the area.

An embodiment of the present invention provides a BBU, including: a signal generating module configured to: when downlink traffic volume in an area among areas covered by multiple RRUs is lower than a preset threshold, generate or receive a group of downlink baseband signals, where the group of downlink baseband signals corresponds to all RRUs in the area; and a signal allocating module configured to transmit the group of downlink baseband signals to each RRU in the area, so that each RRU generates downlink radio frequency signals based on the downlink baseband signals and sends the downlink radio frequency signals.

An embodiment of the present invention provides a BBU, including: a receiving module configured to receive uplink baseband signals transmitted by each RRU in an area among areas covered by corresponding multiple RRUs, where the uplink baseband signals transmitted by each RRU are obtained by converting received radio frequency signals by each RRU; and a signal combining module configured to: when uplink traffic volume in the area is lower than a preset threshold, combine the uplink baseband signals transmitted by each RRU in the area into one group of uplink baseband signals, where the group of uplink baseband signals corresponds to all RRUs in the area.

An embodiment of the present invention provides a method for transmitting baseband signals. The method includes: receiving indication information of a BBU corresponding to areas covered by multiple RRUs, where the indication information is used to indicate information about RRUs in an area among the areas covered by the multiple RRUs; generating a group of downlink baseband signals according to the indication information, where the group of downlink baseband signals corresponds to all RRUs in the area; and transmitting the group of downlink baseband signals to the BBU corresponding to the areas covered by the multiple RRUs, where the BBU corresponding to the areas covered by the multiple RRUs is configured to transmit the group of downlink baseband signals to each RRU in the area, so that each RRU generates downlink radio frequency signals based on the downlink baseband signals and sends the downlink radio frequency signals.

An embodiment of the present invention provides a BBU, including: an information receiving module configured to receive indication information of a BBU corresponding to areas covered by multiple RRUs, where the indication information is used to indicate information about RRUs in an area among the areas covered by the multiple RRUs; a baseband signal generating module configured to generate a group of downlink baseband signals according to the indication information, where the group of downlink baseband signals corresponds to all RRUs in the area; and a transmitting module configured to transmit the group of downlink baseband signals to the BBU corresponding to the areas covered by the multiple RRUs, where the BBU corresponding to the areas covered by the multiple RRUs is configured to transmit the group of downlink baseband signals to each RRU in the area, so that each RRU generates downlink radio frequency signals based on the downlink baseband signals and sends the downlink radio frequency signals.

According to the technical solutions provided in the embodiments of the present invention, in a downlink direction, when traffic volume in an area among areas covered by multiple RRUs is lower than a preset threshold, a group of downlink baseband signals is generated or received, where the group of downlink baseband signals corresponds to all RRUs in the area, and the group of downlink baseband signals is transmitted to RRUs in cells in the area; or, in an uplink direction, when traffic volume in an area among areas covered by multiple RRUs is lower than a preset threshold, the uplink baseband signals of the RRU in the area are combined into a group of uplink baseband signals, where the uplink baseband signals correspond to all cells in the area. In this way, the bandwidth for transmitting baseband signals is greatly lowered, implementation is easy, and complexity of a system is reduced.

BRIEF DESCRIPTION OF THE DRAWINGS

To make the technical solutions of the embodiments of the present invention or the prior art clearer, the accompanying drawings used in the description of the embodiments or the prior art are briefly described hereunder. Evidently, the accompanying drawings illustrate only some embodiments of the present invention and persons of ordinary skill in the art may obtain other drawings based on these drawings without creative efforts.

DETAILED DESCRIPTION

The technical solutions in the embodiments of the present invention are hereinafter described clearly and completely with reference to the accompanying drawings. Apparently, the described embodiments are only some embodiments of the present invention, rather than all the embodiments of the present invention. Based on the embodiments of the present invention, all other embodiments obtained by persons of ordinary skill in the art without making any creative effort shall fall within the protection scope of the present invention.

Figure 1:
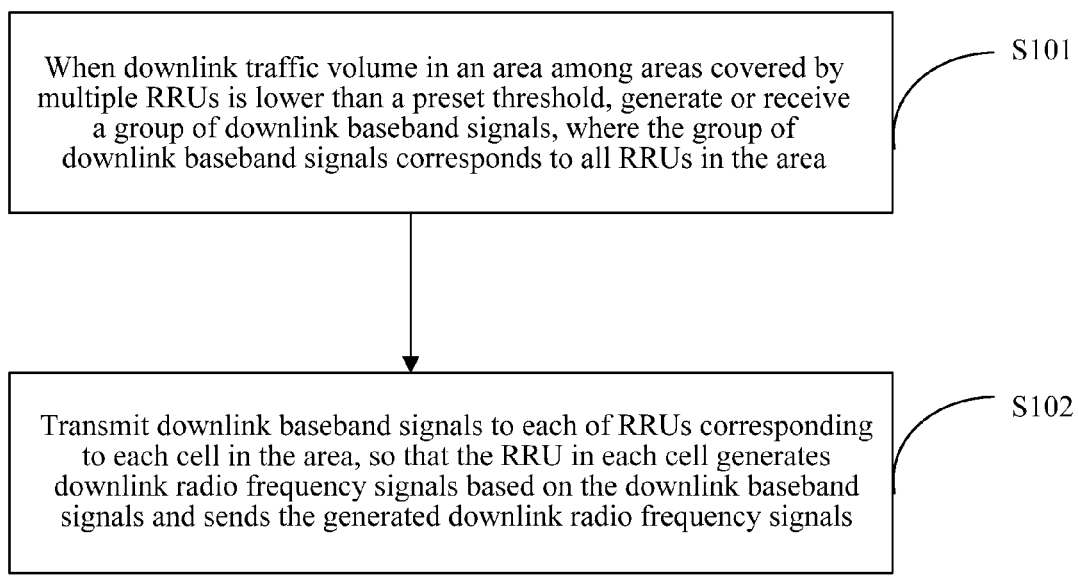
FIG. 1 is a flow chart of a method for transmitting baseband signals according to an embodiment of the present invention.

As shown in FIG. 1, an embodiment of the present invention provides a method for transmitting baseband signals. The method includes the following steps:

S101: When downlink traffic volume in an area among areas covered by multiple RRUs is lower than a preset threshold, generate or receive a group of downlink baseband signals, where the group of downlink baseband signals corresponds to all RRUs in the area.

It should be noted that the group of downlink baseband signals may be generated by a BBU corresponding to the areas covered by the multiple RRUs; or may also be generated by another BBU (which does not correspond to the areas covered by the multiple RRUs), and transmitted to the BBU corresponding to the areas covered by the multiple RRUs, that is, the BBU corresponding to the areas covered by the multiple RRUs receives the group of downlink baseband signals generated by another BBU.

In an embodiment, it is assumed that k (here, k is a natural number) is the number of antennas in an RRU that has the fewest antennas among all RRUs in the area. Then the group of downlink baseband signals is generated according to k (it should be noted that no matter whether the group of downlink baseband signals is generated by the BBU corresponding to the areas covered by the multiple RRUs or the group of downlink baseband signals is generated by another BBU, the group of downlink baseband signals may be generated according to k). In this case, this group of downlink baseband signals includes k paths of downlink baseband signals (that is, this group of downlink baseband signals is composed of the k paths of downlink baseband signals. Of course, in an embodiment, this group of downlink baseband signals may further include signals other than downlink baseband signals, for example, signals such as noise). In an embodiment, two cases are available:

1. In an embodiment, if each RRU in the area has the same number of antennas, a first BBU generates the group of downlink baseband radio signals according to the number of antennas; in this case, the minimum number of antennas of each RRU is the number k of its respective antennas.

2. In an embodiment, if each RRU in the area has a different quantity of antennas, a first BBU generates the group of downlink baseband signals according to the number k of antennas of the RRU that has the fewest antennas among all RRUs.

Of course, it is easily understood that when the minimum number of antennas is 1, the group of downlink baseband signals includes only one path of downlink baseband signal. In this case, the first BBU generates only one path of downlink baseband signal.

S102: Transmit the downlink baseband signals to each RRU in the area, so that each RRU generates downlink radio frequency signals based on the downlink baseband signals and sends the generated downlink radio frequency signals.

In an embodiment, when the group of downlink baseband signals is generated by the BBU corresponding to the areas covered by the multiple RRUs, the BBU corresponding to the areas covered by the multiple RRUs transmits the group of downlink baseband signals to each RRU in the area.

In an embodiment, when this group of downlink baseband signals is generated by another BBU, the another BBU transmits this group of downlink baseband signals generated to the BBU corresponding to the areas covered by the multiple RRUs; after receiving this group of downlink baseband signals transmitted by the another BBU, the BBU corresponding to the areas covered by the multiple RRUs transmits this group of downlink baseband signals to each RRU in the area.

In this embodiment, when the traffic volume in an area among the areas covered by the multiple RRUs is lower than a preset threshold, only one group of downlink baseband signals is generated for this area. In an embodiment, the BBU that generates this group of downlink baseband signals may further transmit this group of downlink baseband signals to the BBU corresponding to the areas covered by the multiple RRUs (for example, when this method is applicable to a distributed system, such as a distributed base station system, a distributed antenna system, or a C-RAN system, and there are multiple BBUs in those systems, the BBUs can process data upon cooperation). Of course, it is easily understood that during a transmission process, multiple intermediate BBUs may be involved. In this way, because only one group of downlink baseband signals is transmitted, transmission bandwidth is greatly lowered during the transmission process.

According to the technical solutions in this embodiment of the present invention, when traffic volume in an area among areas covered by multiple RRUs is lower than a preset threshold, only one group of downlink baseband signals is generated for this area, the downlink baseband signals correspond to all cells in the area, and this group of downlink baseband signals is transmitted to an RRU in each cell in the area. In addition, the BBU that generates this group of downlink baseband signals may further transmit this group of downlink baseband signals to the BBU corresponding to the areas covered by the multiple RRUs for processing. In this way, the bandwidth for transmitting downlink baseband signals is greatly lowered, implementation is easy, and complexity of a system is reduced.

Figure 2:
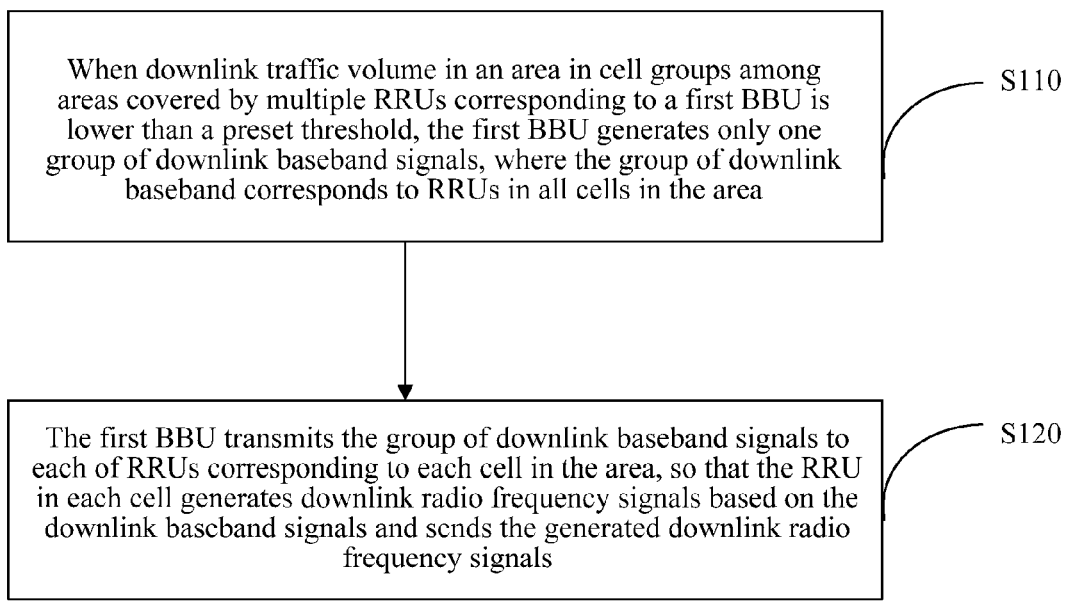
FIG. 2 is a flow chart of a method for transmitting baseband signals according to an embodiment of the present invention.

As shown in FIG. 2, an embodiment of the present invention provides a method for transmitting baseband signals. The method includes the following steps:

S110: When downlink traffic volume in an area among areas covered by multiple RRUs corresponding to a first BBU is lower than a preset threshold, the first BBU generates a group of downlink baseband signals, where the group of downlink baseband signals corresponds to all RRUs in the area.

In an embodiment, it is assumed that k (here, k is a natural number) is the number of antennas in an RRU that has the fewest antennas among all RRUs in the area. The first BBU generates this group of downlink baseband signals according to k. In this case, this group of downlink baseband signals includes k paths of downlink baseband signals (that is, this group of downlink baseband signals is composed of the k paths of downlink baseband signals. Of course, in an embodiment, this group of downlink baseband signals may further include signals other than downlink baseband signals, for example, signals such as noise). In an embodiment, two cases are available:

1. In an embodiment, if each RRU corresponding to each cell in the area has the same number of antennas, a first BBU generates this group of downlink baseband radio signals according to the number of antennas; in this case, the minimum number of antennas of each RRU is the number k of its respective antennas.

2. In an embodiment, if each RRU in the area has a different quantity of antennas, the first BBU generates the group of downlink baseband signals according to the number k of antennas of the RRU that has the fewest antennas among all RRUs.

For example, the area includes four RRUs, where two RRUs each has four antennas and the other two RRUs each has two antennas. In this case, the first BBU generates the group of downlink baseband signals assuming that each RRU has two antennas, where the group of downlink baseband signals corresponds to all cells in the area. In this case, the group of downlink baseband signals includes two paths of downlink baseband signals.

In an embodiment, in step S110, when downlink traffic volume in an area among areas covered by multiple RRUs corresponding to the first BBU is lower than a preset threshold, the group of downlink baseband signals generated by the first BBU corresponds to all RRUs in the area. In this case, the area may be regarded as an independent communication area.

S120: The first BBU transmits the group of downlink baseband signals to each RRU, so that each RRU generates downlink radio frequency signals based on the downlink baseband signals and sends the generated downlink radio frequency signals.

In an embodiment, after a group of downlink baseband signals is generated by using the method (which uses the minimum number of antennas) in step S110, the first BBU may transmit the group of downlink baseband signals to each RRU in the area by using the following methods:

1. For each RRU in the area, any k antennas among all antennas are fixedly selected, and k paths of downlink baseband signals are transmitted to k antennas of the RRU, respectively. Here, k is the number of antennas in the RRU that has the fewest antennas among all RRUs. After receiving the k paths of downlink baseband signals (the group of downlink baseband signals includes the k paths of downlink baseband signals), each RRU generates downlink radio frequency signals based on the downlink baseband signals, and sends the generated downlink radio frequency signals by using the k antennas, respectively. Of course, it is easily understood that all antennas of the RRU that has the smallest number (k antennas) of antennas are selected when the method is used.

Of course, it is easily understood that when the minimum number of antennas is 1, the group of downlink baseband signals includes only one path of downlink baseband signal. In this case, the first BBU generates only one path of downlink baseband signal.

For example, the area includes four RRUs, where two RRUs each has four antennas and the other two RRUs each has two antennas. For the two RRUs that each has four antennas, any two of the four antennas may be fixedly selected to transmit the two paths of generated downlink baseband signals, respectively (that is, one path of downlink baseband signal is transmitted to one of the two antennas, and the other path of downlink baseband signal is transmitted to the other antenna. The group of downlink baseband signals includes the two paths of downlink baseband signals). After the downlink baseband signals transmitted by the first BBU are received on the two fixedly selected antennas in each RRU (it is easily understood that for an RRU that has two antennas, the two antennas are both selected), each RRU generates downlink radio frequency signals based on the downlink baseband signals, and sends the generated downlink radio frequency signals by using the two fixedly selected antennas.

2. For each RRU in the area, any k antennas among all antennas are selected at a preset interval, and k paths of downlink baseband signals are transmitted to k antennas of each RRU, respectively. Here, k is the number of antennas in the RRU that has the fewest antennas among all RRUs. After receiving the k paths of downlink baseband signals (the group of downlink baseband signals includes the k paths of downlink baseband signals), each RRU generates downlink radio frequency signals based on the downlink baseband signals, and sends the generated downlink radio frequency signals by using the k antennas, respectively.

For example, the area includes four RRUs, where two RRUs each has four antennas and the other two RRUs each has two antennas. For the two RRUs that each has four antennas, two of the four antennas may be selected at a first time segment to transmit a group of generated downlink baseband signals (this group of downlink baseband signals includes two paths of downlink baseband signals), respectively, and the other two of the four antennas are selected at a second time segment to transmit two paths of generated downlink baseband signals (that is, one path of downlink baseband signal is transmitted to one of the two antennas, and the other path of downlink baseband signal is transmitted to the other antenna), respectively. After the downlink baseband signals transmitted by the first BBU are received on the two selected antennas in each RRU (it is easily understood that for an RRU that has two antennas, the two antennas are both selected), each RRU generates downlink radio frequency signals based on the downlink baseband signals, and sends the generated downlink radio frequency signals by using the two selected antennas.

3. For each RRU in the area, the antennas are divided into k groups, and k paths of downlink baseband signals are transmitted to the k groups of antennas in each RRU, respectively. Here, k is the number of antennas in the RRU that has the fewest antennas among all RRUs. After receiving the downlink baseband signals, each RRU generates downlink radio frequency signals based on the downlink baseband signals, and then sends the generated downlink radio frequency signals by using the k groups of antennas, respectively.

For example, the area includes four RRUs, where two RRUs each has four antennas and the other two RRUs each has two antennas. For the two RRUs that each has four antennas, the four antennas of each RRU are divided into two groups, and the two paths of generated downlink baseband signals are transmitted to the two groups of antennas, respectively.

For example, in an embodiment, each group may contain two antennas. In this case, one path of downlink baseband signal is transmitted to one group of antennas, and the other path of downlink baseband signal is transmitted to the other group of antennas. In an embodiment, one group may contain one antenna, and the other group may contain three antennas. In this case, one path of downlink baseband signal is transmitted to one group (that contains one antenna), and the other path of downlink baseband signal is transmitted to the other group (that contains three antennas).

After the downlink baseband signals transmitted by the first BBU are received on two groups of antennas in each RRU, each RRU generates downlink radio frequency signals based on the downlink baseband signals, and sends the generated downlink radio frequency signals by using the two groups of antennas, respectively.

Of course, it is easily understood that in an embodiment, if each RRU in the area has the same number of antennas (in this case, the number of antennas is the same, and the minimum number k of antennas is the number of all antennas in an RRU; therefore, the group of downlink baseband signals is generated according to the number of all antennas in an RRU), the first BBU transmits k paths of downlink baseband signals to all antennas in each RRU when transmitting the downlink baseband signals to each RRU in the area.

In an embodiment, the first BBU may be connected to each RRU through a star connection. It is assumed that the number of all RRUs in an area among the areas covered by the multiple RRUs is N, where N is a positive integer. In this case, the first BBU replicates the group of downlink baseband signals by N copies, and sends the N copies of downlink baseband signals to the N RRUs, respectively. The specific transmission methods for antennas in each RRU are described in detail in the preceding embodiments, and are not described herein.

In an embodiment, the first BBU may be connected to each RRU through a ring connection. That is, the same physical fiber ring is used to connect each RRU and the first BBU. It is assumed that the number of all cells in an area among the areas covered by the multiple RRUs is N, where N is a positive integer. In this case, the first BBU transmits the same group of downlink baseband signals to the N RRUs by using a ring connection link. The transmission methods for antennas in each RRU are described in detail in the preceding embodiments, and are not described herein.

In an embodiment, if there are N RRUs in total in the area, and each RRU has k antennas, only k paths of downlink baseband signals (the k paths of downlink baseband signals are a group of downlink baseband signals, and correspond to N RRUs in the area) need to be generated according to the method provided in this embodiment of the present invention; N*k paths of downlink baseband signals need to be generated if the method provided in this embodiment of the present invention is not used. It can be seen that the bandwidth for transmitting downlink baseband signals may be lowered by N times when the method provided in this embodiment of the present invention is used.

In another embodiment, when the RRUs in the area have different quantities of antennas, and it is assumed that only one RRU has k antennas, and the rest of the RRUs each has more than k antennas, according to the method provided in this embodiment of the present invention, only k paths of downlink baseband signals need to be generated (the k paths of downlink baseband signals are a group of downlink baseband signals, and correspond to N RRUs in the area). If the method provided in this embodiment of the present invention is not used, apparently more than N*k paths of downlink baseband signals need to be generated. It can be seen that, the method provided in this embodiment of the present invention may lower the bandwidth for transmitting downlink baseband signals by more than N times.

In this embodiment, when traffic volume in an area among areas covered by multiple RRUs is lower than a preset threshold, the first BBU generates only one group of downlink baseband signals for this area.

It is easily understood that the first BBU may transmit the group of generated downlink baseband signals to another BBU for processing (for example, when this method is applicable to a distributed system, such as a distributed base station system, a distributed antenna system, or a C-RAN system, and there are multiple BBUs in those systems, the BBUs can process data upon cooperation), and during a transmission process, multiple intermediate BBUs may be involved. In this way, because only one group of downlink baseband signals is transmitted, transmission bandwidth is greatly lowered during the transmission process. In addition, after the first BBU generates this group of downlink baseband signals, only k paths of signals need to be transmitted during internal transmission of the first BBU (for example, when the group of downlink baseband signals is transmitted internally from a board to another board). Compared with a case in which the solution in this embodiment is not used, transmission bandwidth is lowered by at least N times.

According to the technical solutions in this embodiment of the present invention, when traffic volume in an area among areas covered by multiple RRUs is lower than a preset threshold, a group of downlink baseband signals is generated for this area, where the downlink baseband signals correspond to all RRUs in the area, and the group of downlink baseband signals is transmitted to each RRU in the area. In this case, the bandwidth for transmitting downlink baseband signals is greatly lowered (the bandwidth for downlink baseband signals is lowered by at least N times, where N is the number of RRUs in the area), implementation is easy, and complexity of a system is reduced. Further, the group of downlink baseband signals may be generated according to the number of antennas in the RRU that has the fewest antennas among all RRUs, thereby further lowering the bandwidth for transmitting downlink baseband signals.

Figure 3:
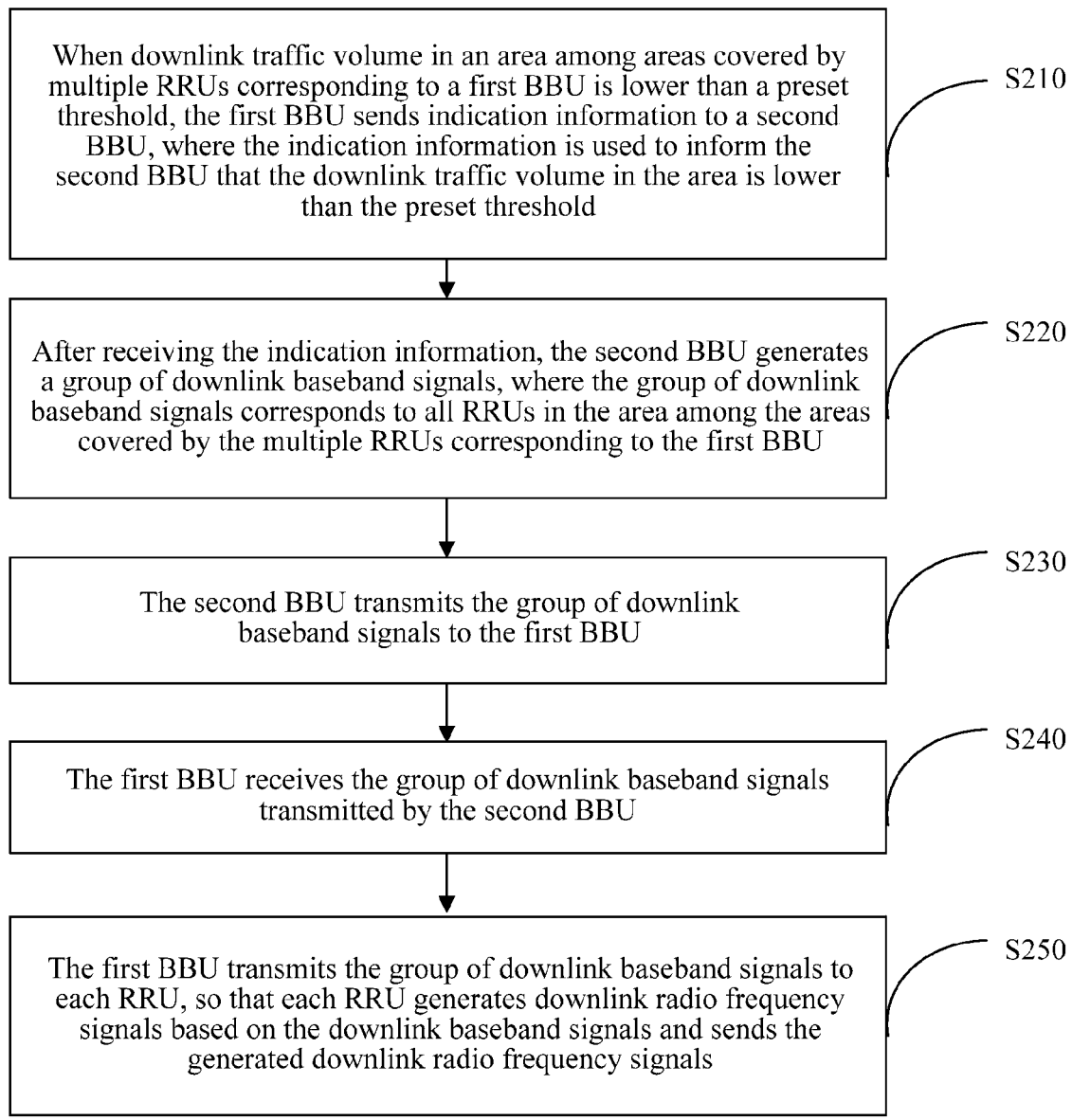
FIG. 3 is a flow chart of a method for transmitting baseband signals according to an embodiment of the present invention.

As shown in FIG. 3, an embodiment of the present invention provides a method for transmitting baseband signals. The method includes the following steps:

S210: When downlink traffic volume in an area among areas covered by multiple RRUs corresponding to a first BBU is lower than a preset threshold, the first BBU sends indication information to a second BBU, where the indication information is used to inform the second BBU of information about RRUs in the area.

In an embodiment, the information about the RRUs in the area includes information, such as the number of RRUs, and the number of antennas in an RRU that has the fewest antennas among all RRUs.

S220: After receiving the indication information, the second BBU generates a group of downlink baseband signals, where the group of downlink baseband signals corresponds to all RRUs in the area among the areas covered by the multiple RRUs corresponding to the first BBU.

In an embodiment, in step S220, when downlink traffic volume in an area among the areas covered by the multiple RRUs corresponding to the first BBU is lower than a preset threshold, the group of downlink baseband signals generated by the second BBU corresponds to all RRUs in the area. In this case, the area may be regarded as an independent communication area.

In an embodiment, it is assumed that k (here, k is a natural number) is the number of antennas in an RRU that has the fewest antennas among all RRUs in the area. The second BBU generates this group of downlink baseband signals according to k. In this case, this group of downlink baseband signals includes k paths of downlink baseband signals (that is, this group of downlink baseband signals is composed of the k paths of downlink baseband signals. Of course, in an embodiment, this group of downlink baseband signals may further include signals other than downlink baseband signals, for example, signals, such as noise). Of course, it is easily understood that when the minimum number of antennas is 1, the group of downlink baseband signals includes only one path of downlink baseband signal. That is, in this case, the second BBU generates only one path of downlink baseband signal.

Of course, two cases may be included:

1. In an embodiment, if each RRU in the area has the same number of antennas, the second BBU generates the group of downlink baseband radio signals according to the number of antennas; in this case, the minimum number of antennas of each RRU is the number of its respective antennas.

2. In an embodiment, if each RRU in the area has a different quantity of antennas, the second BBU generates the group of downlink baseband signals according to the number of antennas in the RRU that has the fewest antennas among all RRUs.

For example, the area includes four RRUs, where two RRUs each has four antennas and the other two RRUs each has two antennas. In this case, the second BBU generates the group of downlink baseband signals assuming that each RRU has two antennas, where the group of downlink baseband signals corresponds to all cells in the area. In this case, the group of downlink baseband signals includes two paths of downlink baseband signals.

S230: The second BBU transmits the group of downlink baseband signals to the first BBU.

S240: The first BBU receives the group of downlink baseband signals transmitted by the second BBU.

S250: The first BBU transmits the group of downlink baseband signals to each RRU, so that each RRU generates downlink radio frequency signals based on the downlink baseband signals and sends the generated downlink radio frequency signals.

In an embodiment, after a group of downlink baseband signals (including k paths of downlink baseband signals) is generated by using the method in step S220, the first BBU may transmit the group of downlink baseband signals to each RRU in the area by using the following methods:

1. For each RRU in the area, any k antennas are fixedly selected from all antennas, and the k paths of downlink baseband signals are transmitted to k antennas of each RRU, respectively. Here, k is the number of antennas in the RRU that has the fewest antennas among all RRUs. After receiving the k paths of downlink baseband signals (the group of downlink baseband signals includes the k paths of downlink baseband signals), each RRU generates downlink radio frequency signals based on the downlink baseband signals, and sends the generated downlink radio frequency signals by using the k antennas, respectively. Of course, it is easily understood that all antennas of the RRU that has the smallest number of antennas (k antennas) are selected when the method is used.

Of course, it is easily understood that when the minimum number of antennas is 1, the group of downlink baseband signals includes only one path of downlink baseband signal. That is, in this case, the second BBU generates only one path of downlink baseband signal.

For example, the area includes four RRUs, where two RRUs each has four antennas and the other two RRUs each has two antennas. For the two RRUs that each has four antennas, any two of the four antennas may be fixedly selected to transmit two paths of generated downlink baseband signals, respectively (that is, one path of downlink baseband signal is transmitted to one of the two antennas, and the other path of downlink baseband signal is transmitted to the other antenna). The group of downlink baseband signals includes the two paths of downlink baseband signals. After the downlink baseband signals transmitted by the first BBU are received on the two fixedly selected antennas in each RRU (it is easily understood that for an RRU that has two antennas, the two antennas are both selected), each RRU generates downlink radio frequency signals based on the downlink baseband signals, and sends the generated downlink radio frequency signals by using the two selected antennas.

2. For each RRU in the area, any k antennas are selected from all antennas at a preset interval, and the k paths of downlink baseband signals are transmitted to k antennas of each RRU, respectively. Here, k is the number of antennas in the RRU that has the fewest antennas among all RRUs. After receiving the k paths of downlink baseband signals (the group of downlink baseband signals includes the k paths of downlink baseband signals), each RRU generates downlink radio frequency signals based on the downlink baseband signals, and sends the generated downlink radio frequency signals by using the k antennas, respectively.

For example, the area includes four RRUs, where two RRUs each has four antennas and the other two RRUs each has two antennas. For the two RRUs that each has four antennas, two of the four antennas may be selected at a first time segment to transmit a group of generated downlink baseband signals, respectively (this group of downlink baseband signals includes two paths of downlink baseband signals), and the other two of the four antennas are selected at a second time segment to transmit two paths of generated downlink baseband signals, respectively (that is, one path of downlink baseband signal is transmitted to one of the two antennas, and the other path of downlink baseband signal is transmitted to the other antenna). After the downlink baseband signals transmitted by the first BBU are received on the two selected antennas in each RRU (it is easily understood that for an RRU that has two antennas, the two antennas are both selected), each RRU generates downlink radio frequency signals based on the downlink baseband signals, and sends the generated downlink radio frequency signals by using the two selected antennas.

3. For each RRU in the area, the antennas are divided into k groups, and the k paths of downlink baseband signals are transmitted to the k groups of antennas in each RRU, respectively. Here, k is the number of antennas in the RRU that has the fewest antennas among all RRUs. After receiving the downlink baseband signals, each RRU generates downlink radio frequency signals based on the downlink baseband signals, and then sends the generated downlink radio frequency signals by using the k groups of antennas, respectively.

For example, the area includes four RRUs, where two RRUs each has four antennas and the other two RRUs each has two antennas. For the two RRUs that each has four antennas, four antennas of each RRU are divided into two groups, and the two paths of generated downlink baseband signals are transmitted to the two groups of antennas, respectively.

For example, in an embodiment, each group may contain two antennas. In this case, one path of downlink baseband signal is transmitted to one group of antennas, and the other path of downlink baseband signal is transmitted to the other group of antennas. In an embodiment, one group may also contain one antenna, and the other group contains three antennas. In this case, one path of downlink baseband signal is transmitted to one group (that contains one antenna), and the other path of downlink baseband signal is transmitted to the other group (that contains three antennas).

After the downlink baseband signals transmitted by the first BBU are received on the two groups of antennas in each RRU, each RRU generates downlink radio frequency signals based on the downlink baseband signals, and sends the generated downlink radio frequency signals by using the two groups of antennas, respectively.

In an embodiment, the first BBU may be connected to each RRU through a star connection. It is assumed that the number of all RRUs in an area among the areas covered by the multiple RRUs is N, where N is a positive integer. In this case, the first BBU replicates the group of downlink baseband signals by N copies, and sends the N copies of downlink baseband signals to the N RRUs, respectively. The specific transmission methods for antennas in each RRU are described in detail in the preceding embodiments, and are not described herein.

In an embodiment, the first BBU may be connected to each RRU through a ring connection. In other words, the same physical fiber ring is used to connect each RRU and the first BBU. It is assumed that the number of all cells in an area among the areas covered by the multiple RRUs is N, where N is a positive integer. In this case, the second BBU transmits the same group of downlink baseband signals by using a ring connection link to the N RRUs. The transmission methods for antennas in each RRU are described in detail in the preceding embodiments, and are not described herein.

In this embodiment, when the traffic volume in an area among the areas covered by the multiple RRUs is lower than a preset threshold, the second BBU generates only one group of downlink baseband signals for the area. It is easily understood that the second BBU may transmit the group of generated downlink baseband signals to another BBU for processing, for example, to the first BBU by using the preceding method. During a transmission process, multiple intermediate BBUs may be involved. In this way, because only one group of downlink baseband signals (this group of downlink baseband signals includes k paths of downlink baseband signals) is transmitted among BBUs, transmission bandwidth is greatly lowered during the transmission process. In addition, after the second BBU generates this group of downlink baseband signals, only k paths of signals need to be transmitted during internal transmission of the second BBU (for example, when the group of downlink baseband signals is transmitted internally from a board to another board). Compared with the case where the solution in this embodiment is not used, the transmission bandwidth is lowered by at least N times.

In an embodiment, when this method may be used in a distributed system, such as a distributed base station system, a distributed antenna system, or a C-RAN system, and there are multiple BBUs in those systems, the BBUs can process data upon cooperation. When the method provided in this embodiment is used, one BBU generates a group of downlink baseband signals (this group of downlink baseband signals includes k paths of downlink baseband signals), and another BBU assists in processing this group of downlink baseband signals, only one group of downlink baseband signals may be transmitted among BBUs. Compared with the case where the solution according to this embodiment is not used, the transmission bandwidth is lowered by at least N times.

According to the technical solutions in this embodiment of the present invention, when traffic volume in an area among areas covered by multiple RRUs is lower than a preset threshold, a group of downlink baseband signals is generated for this area, where the downlink baseband signals correspond to all RRUs in the area, and the group of downlink baseband signals is transmitted to each RRU in the area. In this case, the bandwidth for transmitting downlink baseband signals is greatly lowered (the bandwidth for transmitting downlink baseband signals is lowered by at least N times, where N is the number of RRUs in the area), implementation is easy, and complexity of a system is reduced. Further, the group of downlink baseband signals may be generated according to the number of antennas in an RRU that has the fewest antennas among all RRUs, which further lowers the bandwidth for transmitting downlink baseband signals.

Figure 4:
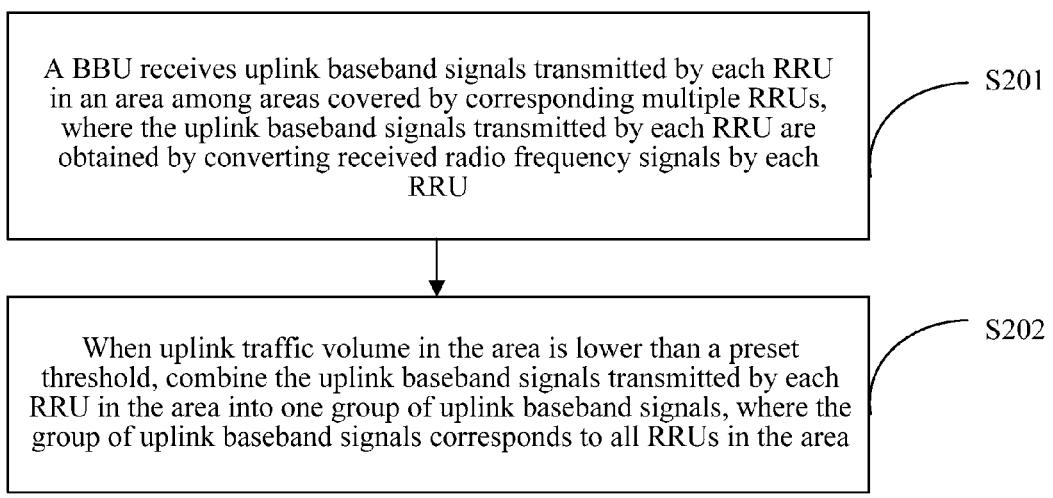
FIG. 4 is a flow chart of a method for transmitting baseband signals according to an embodiment of the present invention.

As shown in FIG. 4, an embodiment of the present invention provides a method for transmitting baseband signals. The method includes the following steps:

S201: A BBU receives uplink baseband signals transmitted by each RRU in an area among areas covered by corresponding multiple RRUs, where the uplink baseband signals transmitted by each RRU are obtained by converting received radio frequency signals by each RRU.

S202: When uplink traffic volume in the area is lower than a preset threshold, combine the uplink baseband signals transmitted by each RRU in the area into one group of uplink baseband signals, where the group of uplink baseband signals corresponds to all RRUs in the area.

In an embodiment, a linear combination method may be used to combine the uplink baseband signals transmitted by each RRU in the area into one group of uplink baseband signals.

In an embodiment, the linear combination method may be a linear addition method, that is, linear addition is performed on the uplink baseband signals transmitted by each RRU in the area to combine the uplink baseband signals into one path of uplink radio signal. In an embodiment, the uplink baseband signals transmitted by each RRU in the area may be first multiplied by a preset proportion coefficient, and then linear addition is performed.

In an embodiment, the BBU may be connected to each RRU in areas covered by multiple RRUs through a star connection.

In an embodiment, the BBU may be connected to each RRU in areas covered by multiple RRUs through a ring connection.

In an embodiment, after combining the uplink baseband signals transmitted by each RRU in the area into one group of uplink baseband signals, the BBU may further perform internal processing (for example, modulation and demodulation) for the group of uplink baseband signals. In this way, the BBU only needs to transmit one group of uplink baseband signals during internal transmission (for example, transmitting internally the group of uplink baseband signals from a board to another board), thereby greatly lowering the bandwidth for transmitting uplink baseband signals.

Of course, it is easily understood that other BBUs may further assist the BBU in processing the group of uplink baseband signals (for example, when this method may be used in a distributed system, such as a distributed base station system, a distributed antenna system, or a C-RAN system, and there are multiple BBUs in those systems, the BBUs can process data upon cooperation). In this way, the BBU may transmit only one group of uplink baseband signals to other BBUs, thereby greatly lowering the bandwidth for transmitting uplink baseband signals.

According to the technical solutions in this embodiment of the present invention, when uplink traffic volume in an area among areas covered by multiple RRUs is lower than a preset threshold, the uplink baseband signals transmitted by each RRU in the area are combined into one group of uplink baseband signals, and the group of uplink baseband signals corresponds to all cells in the area. In this way, the bandwidth for transmitting uplink baseband signals is greatly lowered, implementation is easy, and complexity of a system is reduced. Further, the group of uplink baseband signals may be generated according to the number of antennas in an RRU that has the fewest antennas among all RRUs, which further lowers the bandwidth for transmitting uplink baseband signals.

Figure 5:
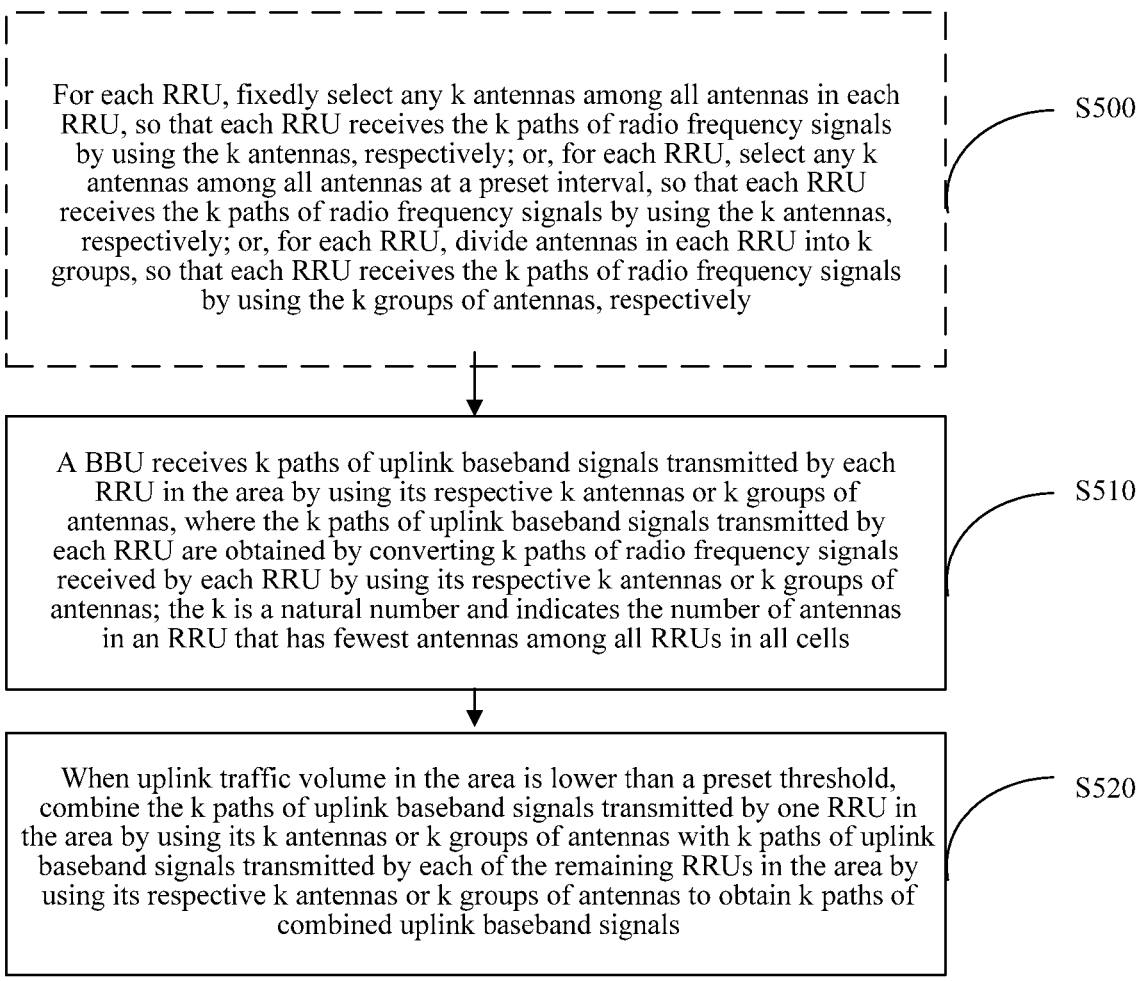
FIG. 5 is a flow chart of a method for transmitting baseband signals according to an embodiment of the present invention.

As shown in FIG. 5, an embodiment of the present invention provides a method for transmitting baseband signals. The method includes the following steps:

S510: A BBU receives k paths of uplink baseband signals transmitted by each RRU in the area by using its respective k antennas or k groups of antennas, where the k paths of uplink baseband signals transmitted by each RRU in the area are obtained by converting k paths of radio frequency signals received by each RRU by using its respective k antennas or k groups of antennas; the k is a natural number and indicates the number of antennas in an RRU that has fewest antennas among all RRUs in all cells.

S520: When uplink traffic volume in the area is lower than a preset threshold, combine the k paths of uplink baseband signals transmitted by one RRU in the area by using its k antennas or k groups of antennas with k paths of uplink baseband signals transmitted by each of the remaining RRUs in the area by using its respective k antennas or k groups of antennas to obtain k paths of combined uplink baseband signals.

It should be noted that the group of uplink baseband signals according to the embodiment as shown in FIG. 4 includes the k paths of combined uplink baseband signals here.

In an embodiment, as shown in the dotted box in FIG. 5, before S510, the method may further include the following:

S500: For each RRU, fixedly select any k antennas among all antennas in each RRU, so that each RRU receives the k paths of radio frequency signals by using the k antennas, respectively; or, for each RRU, select any k antennas among all antennas at a preset interval, so that each RRU receives the k paths of radio frequency signals by using the k antennas, respectively; or, for each RRU, divide antennas in each RRU into k groups, so that each RRU receives the k paths of radio frequency signals by using the k groups of antennas, respectively.

For example, in an embodiment, it is assumed that there are three RRUs in the area, which are RRU 1, RRU 2, and RRU 3, where the minimum number of antennas of RRU 1 is 2 and RRU 2 and RRU 3 each has more than two antennas. After two antennas are selected from each of RRU 2 and RRU 3 by using the method provided in S500, each RRU receives two paths of radio frequency signals through air interfaces according to its respective two selected antennas, converts the two paths of received radio frequency signals into uplink baseband signals, and transmits them to a BBU. In this way, the BBU may receive six paths of uplink baseband signals (because each RRU transmits two paths of uplink baseband signals, three RRUs transmit six paths of uplink baseband signals in total).

When uplink traffic volume in this area is lower than a preset threshold, the BBU combines the received six paths of uplink baseband signals to obtain a group of uplink baseband signals. In an embodiment, the BBU combines the two paths of received uplink baseband signals transmitted by RRU 1, two paths of received uplink baseband signals transmitted by RRU 2, and two paths of received uplink baseband signals transmitted by RRU 3 to obtain two paths of combined uplink baseband signals.

Specifically, in an embodiment, the BBU combines a first uplink baseband signal of two paths of received uplink baseband signals transmitted by RRU 1, a first uplink baseband signal of two paths of received uplink baseband signals transmitted by RRU 2, and a first uplink baseband signal of two paths of received uplink baseband signals transmitted by RRU 3 to obtain one path of combined uplink baseband signal; and the BBU combines a second uplink baseband signal of the two paths of received uplink baseband signals transmitted by RRU 1, a second uplink baseband signal of the two paths of received uplink baseband signals transmitted by RRU 2, and a second uplink baseband signal of the two paths of received uplink baseband signals transmitted by RRU 3 to obtain the other path of combined uplink baseband signal. After the combination, two paths of combined uplink baseband signals (that is, a group of uplink baseband signals) are obtained in total.

Of course, in another embodiment, the BBU combines a first uplink baseband signal of two paths of received uplink baseband signals transmitted by RRU 1, a second uplink baseband signal of two paths of received uplink baseband signals transmitted by RRU 2, and a first uplink baseband signal of two paths of received uplink baseband signals transmitted by RRU 3 to obtain one path of combined uplink baseband signal; and the BBU combines a second uplink baseband signal of the two paths of received uplink baseband signals transmitted by RRU 1, a first uplink baseband signal of the two paths of received uplink baseband signals transmitted by RRU 2, and a second uplink baseband signal of the two paths of received uplink baseband signals transmitted by RRU 3 to obtain the other path of combined uplink baseband signal.

Of course, it is easily understood that in other embodiments, other combination methods may be applied to obtain two paths of combined uplink baseband signals. This embodiment of the present invention is not limited thereto.

Of course, it is easily understood that the combination methods are also applicable to the case when the minimum number of antennas is k, that is, one path of signal transmitted by one RRU is combined with one path of signal of each of other RRUs, and the rest may be deduced through analogy until a last path of signal transmitted by this RRU is combined with a last path of signal transmitted by each of other RRUs to obtain k paths of combined uplink baseband signals.

In an embodiment, if the total number of RRUs in the area is N, and each RRU has k antennas, then according to the method in this embodiment of the present invention, there are only k paths of uplink baseband signals left after the BBU combines uplink signals transmitted by each RRU by using k antennas; when the method in this embodiment of the present invention is not used, N*k paths of uplink baseband signals exist at the BBU. It may be seen that the method provided in this embodiment of the present invention may lower the bandwidth for transmitting uplink baseband signals by N times.

In another embodiment, if the RRUs have different quantities of antennas, it is assumed that only one RRU has k antennas and the rest of the RRUs each has more than k antennas, then according to the method in this embodiment of the present invention, each RRU selects k antennas to send uplink baseband signals, there are only k paths of uplink baseband signals left after the BBU combines uplink signals transmitted by each RRU by using k antennas; if the method in this embodiment of the present invention is not used, more than N*k paths of uplink baseband signals exist at the BBU. It can be seen that the method provided in this embodiment of the present invention may lower the bandwidth for transmitting uplink baseband signals by more than N times.

In an embodiment, after combining the uplink baseband signals transmitted by each RRU in the area into one group of uplink baseband signals, the BBU may further perform internal processing (for example, modulation and demodulation) for the group of uplink baseband signals. In this way, the BBU only needs to transmit one group of uplink baseband signals (this group of uplink baseband signals includes k paths of uplink baseband signals) during internal transmission (for example, transmitting internally the group of uplink baseband signals from one board to another board). In this way, the bandwidth for transmitting uplink baseband signals is lowered by at least N times.

Of course, it is easily understood that other BBUs may further assist the BBU in processing the group of uplink baseband signals (for example, when this method may be applicable to a distributed system, such as a distributed base station system, a distributed antenna system, or a C-RAN system, and there are multiple BBUs in those systems, the BBUs can process data upon cooperation). In this way, the BBU may transmit only one group of uplink baseband signals to other BBUs. In this way, the bandwidth for transmitting uplink baseband signals is lowered by at least N times.

According to the technical solutions in this embodiment of the present invention, when uplink traffic volume in an area among areas covered by multiple RRUs is lower than a preset threshold, the uplink baseband signals transmitted by each RRU in the area are combined into one group of uplink baseband signals, and the group of uplink baseband signals corresponds to all cells in the area. In this way, the bandwidth for transmitting uplink baseband signals is greatly lowered, implementation is easy, and complexity of a system is reduced. Further, the uplink baseband signals transmitted by each RRU are transmitted by using the minimum number of antennas or antenna group selected by the BBU, and the group of uplink baseband signals obtained by combining the uplink baseband signals is transmitted by using the minimum number of antennas or antenna group selected, thereby further lowering the bandwidth for transmitting uplink baseband signals.

Figure 6:
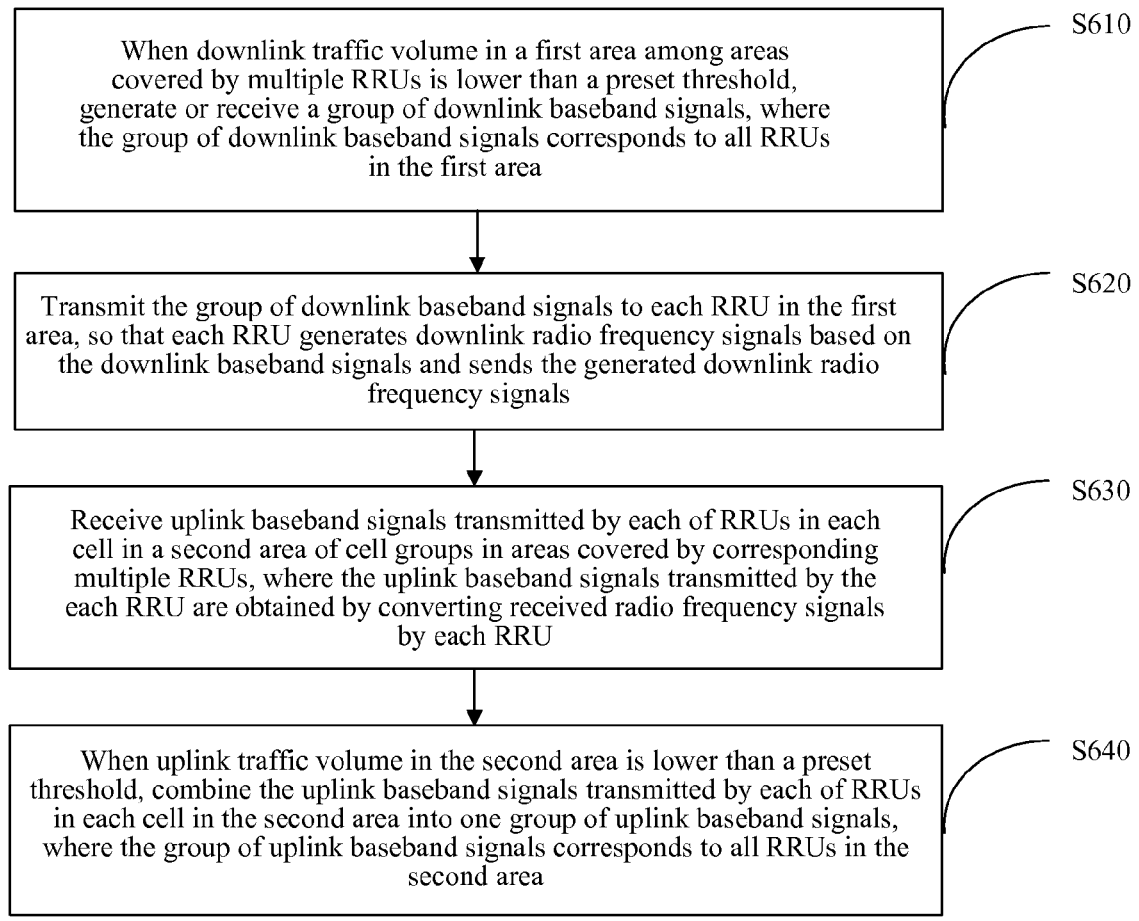
FIG. 6 is a flow chart of a method for transmitting baseband signals according to an embodiment of the present invention.

As shown in FIG. 6, an embodiment of the present invention provides a method for transmitting baseband signals. The method includes the following steps:

S610: When downlink traffic volume in a first area among areas covered by multiple RRUs is lower than a preset threshold, generate or receive a group of downlink baseband signals, where the group of downlink baseband signals corresponds to all RRUs in the first area.

In step S610, according to an embodiment, a BBU corresponding to the areas covered by the multiple RRUs generates a group of downlink baseband signals. According to an embodiment, another BBU (it does not correspond to the areas covered by the multiple RRUs) may generate this group of downlink baseband signals and transmit them to the BBU corresponding to the multiple RRUs.

S620: Transmit the downlink baseband signals to each RRU in the first area, so that each RRU generates downlink radio frequency signals based on the downlink baseband signals and sends the generated downlink radio frequency signals.

S630: Receive uplink baseband signals transmitted by each RRU in a second area among areas covered by corresponding multiple RRUs, where the uplink baseband signals transmitted by each RRU are obtained by converting received radio frequency signals by each RRU.

S640: When uplink traffic volume in the second area is lower than a preset threshold, combine the uplink baseband signals transmitted by each RRU in the second area into one group of uplink baseband signals, where the group of uplink baseband signals corresponds to all RRUs in the second area.

In steps S610 to S640, the specific transmission methods in which each RRU has the same number of antennas and the different number of antennas are already described in the preceding embodiments, and are not described herein.

In steps S630 and S640, the specific transmission methods in which each RRU has the same number of antennas and the different number of antennas are already described in the preceding embodiments, and are not described herein.

It should be noted that according to an embodiment, the steps (S610 and S620) involving downlink and the steps (S630 and S640) involving uplink may be performed at the same time. According to an embodiment, the steps (S610 and S620) involving downlink and the steps (S630 and S640) involving uplink may not be performed at the same time. For example, when the downlink traffic volume is large, but the uplink traffic volume is small and lower than a preset threshold, a group of downlink baseband signals (this group of downlink baseband signals includes k paths of downlink baseband signals) is not generated in a downlink direction in the downlink direction, but according to the total number of antennas in all RRUs in the first area, the corresponding number of paths of downlink baseband signals are generated; in an uplink direction, the uplink baseband signals transmitted by each of RRUs in each cell in the second area are combined into a group of uplink baseband signals. For example, according to an embodiment, there are 10 RRUs in total, and each RRU has 2 antennas. In this case, in the downlink direction, 20 paths instead of 2 paths of downlink baseband signals (the 2 paths of downlink baseband signals constitute a group of downlink baseband signals) are generated according to the total number of antennas. On the contrary, when the uplink traffic volume is large, but the downlink traffic volume is small and lower than a preset threshold, in the uplink direction, the uplink baseband signals transmitted by each RRU in the second area are not combined; in the downlink direction, a group of downlink baseband signals is generated, where the downlink baseband signals correspond to all cells in the first area. For example, according to an embodiment, there are 10 RRUs in total, and each RRU has 2 antennas. In this case, in the downlink direction, only 2 paths of downlink baseband signals (the 2 paths of downlink baseband signals constitute a group of downlink baseband signals) are generated. In the uplink direction, the RRUs need to transmit 20 uplink baseband signals in total, and do not combine them.

According to an embodiment, if each RRU has a different quantity of antennas, for example, among the 10 RRUs, if one RRU has one antenna, and the other 9 RRUs each has 2 antennas, in the downlink direction, when the method according to this embodiment of the present invention is not used, 19 downlink baseband signals need to be generated. When the method according to this embodiment of the present invention is used, only one path of downlink baseband signal (this path of downlink baseband signal constitutes a group of downlink baseband signal) needs to be generated, and the bandwidth for transmitting downlink baseband signals is only $1/19$ of the original bandwidth. In the uplink direction, if the method according to this embodiment of the present invention is not used, 19 uplink baseband signals need to be transmitted. If the method according to this embodiment of the present invention is used, an RRU that has more than one antenna select only one antenna to receive a radio frequency signal and transmit an uplink baseband signal, and after combination performed at the BBU, there is only one path of uplink baseband signal. In this way, only one path of uplink baseband signal needs to be transmitted. The bandwidth for transmitting uplink baseband signals is only $1/19$ of the original bandwidth.

It can be seen that, according to the method provided in this embodiment, if each RRU has the same number of antennas, the transmission bandwidth at the uplink or downlink may be reduced to $1/N$ of the original bandwidth, where N is the number of RRUs in the area (the downlink corresponds to the first area; the uplink corresponds to the second area). If each RRU has a different quantity of antennas, the transmission bandwidth at the uplink or downlink may be reduced to be less than $1/N$ of the original bandwidth. In this way, the bandwidth for transmitting baseband signals is greatly reduced, and the effect is apparent.

In addition, it should be further noted that in an embodiment, the first area and the second area may be the same, that is, the first area and the second area each may be formed by the same RRUs; in an embodiment, the first area and the second area may also be different, that is, the first area and the second area each may be formed by different RRUs.

According to the technical solutions provided in the embodiments of the present invention, in the downlink direction, when traffic volume in an area among areas covered by multiple RRUs is lower than a preset threshold, a group of downlink baseband signals is generated for the area, where the downlink baseband signals correspond to all RRUs in the area, and the group of downlink baseband signals is transmitted to each RRU in each cell in the area; or, in the uplink direction, when traffic volume in an area among areas covered by multiple RRUs is lower than a preset threshold, the uplink baseband signals of each RRU in the area are combined into a group of uplink baseband signals, where the uplink baseband signals correspond to all cells in the area. With the technical solutions, the bandwidth for transmitting baseband signals is greatly lowered, implementation is easy, and complexity of a system is reduced.

Figure 7:
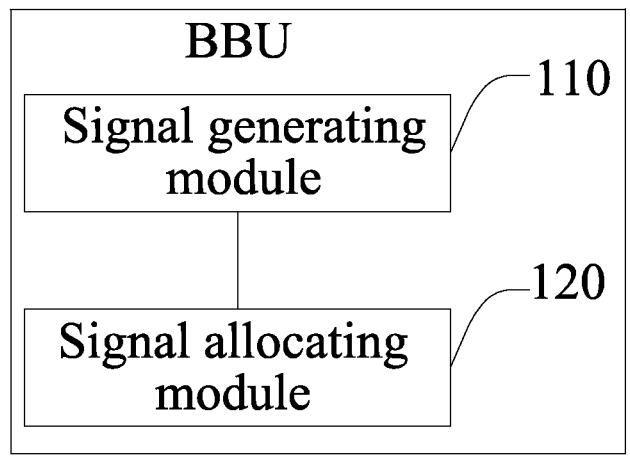
FIG. 7 is a schematic structural diagram of a BBU according to an embodiment of the present invention.

As shown in FIG. 7, an embodiment of the present invention provides a BBU, including: a signal generating module 110 configured to: when downlink traffic volume in an area among areas covered by multiple RRUs is lower than a preset threshold, generate or receive a group of downlink baseband signals, where the group of downlink baseband signals corresponds to all RRUs in the area; and a signal allocating module 120 configured to transmit the group of downlink baseband signals to each RRU in the area, so that each RRU generates downlink radio frequency signals based on the downlink baseband signals and sends the downlink radio frequency signals.

Figure 8:
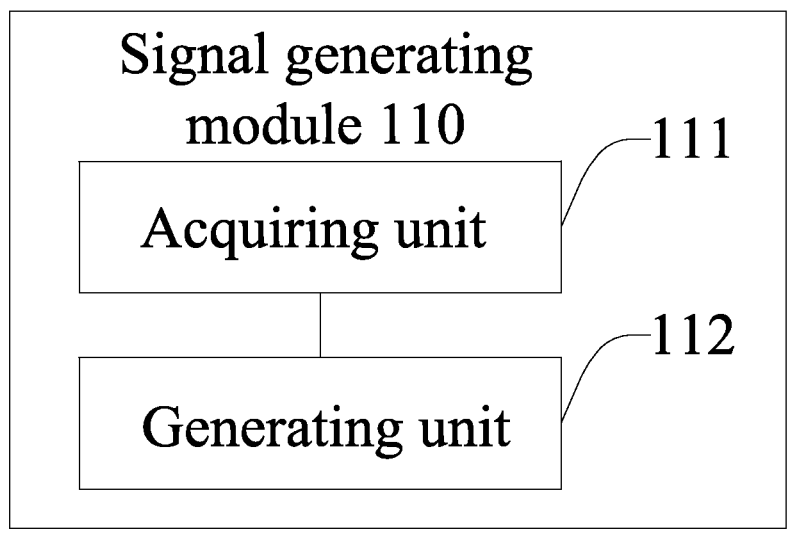
FIG. 8 is a schematic structural diagram of a signal generating module of a BBU according to an embodiment of the present invention.

In an embodiment, as shown in FIG. 8, the signal generating module 110 may include: an acquiring unit 111 configured to acquire the number of antennas in an RRU that has fewest antennas among all RRUs in the area.

In an embodiment, the acquiring unit 111 may acquire the number of antennas in the RRU that has the fewest antennas in advance, or may acquire the number of antennas in the RRU that has the fewest antennas during a handling process. The signal generating module 110 may also include a generating unit 112 configured to: generate the group of downlink baseband signals according to the number of antennas in the RRU that has the fewest antennas among all RRUs, where the group of downlink baseband signals includes k paths of downlink baseband signals, and k is a natural number and indicates the number of antennas in the RRU that has the fewest antennas among all RRUs.

In another embodiment, the signal generating module 110 may be specifically configured to: when downlink traffic volume in an area among areas covered by multiple RRUs is lower than a preset threshold, receive a group of downlink baseband signals that is generated by another BBU according to the number of antennas in an RRU that has fewest antennas among all RRUs in the area, where the group of downlink baseband signals corresponds to all RRUs in the area, the BBU corresponds to the areas covered by the multiple RRUs, and the another BBU does not correspond to the areas covered by the multiple RRUs.

The group of downlink baseband signals includes k paths of downlink baseband signals, and the k is a natural number and indicates the number of antennas in the RRU that has the fewest antennas among all RRUs.

Figure 9:
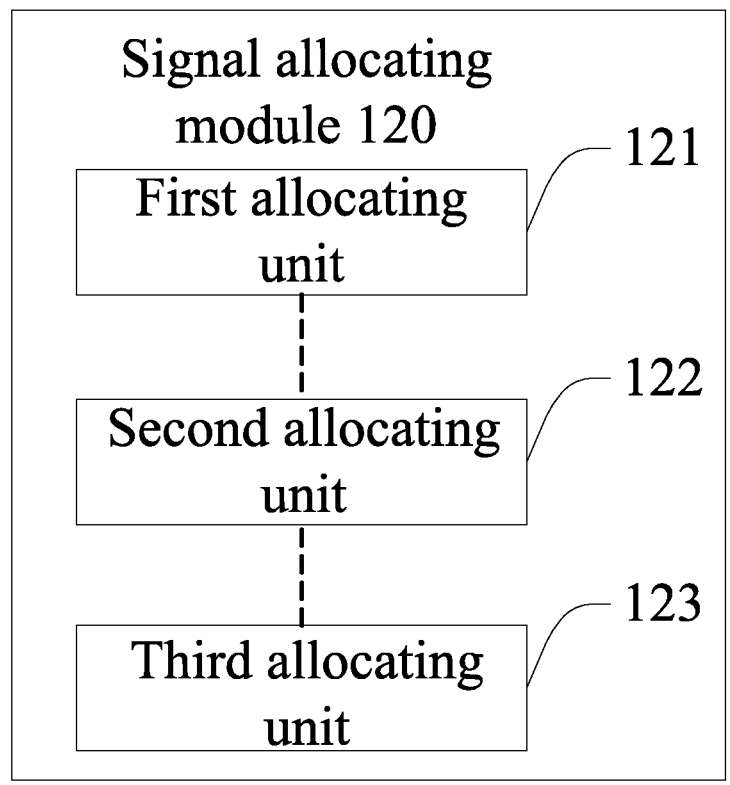
FIG. 9 is a schematic structural diagram of a signal allocating module of a BBU according to an embodiment of the present invention.

In an embodiment, as shown in FIG. 9, the signal allocating module 120 may include: a first allocating unit 121, a second allocating unit 122, or a third allocating unit 123, where:

The first allocating unit 121 is configured to fixedly select any k antennas among all antennas in each RRU, and transmit the k paths of downlink baseband signals to the k antennas in each RRU, respectively, so that each RRU generates downlink radio frequency signals based on the downlink baseband signals and sends the downlink radio frequency signals by using the k antennas.

The second allocating unit 122 is configured to select any k antennas among all antennas in each RRU at a preset interval, and transmit the k paths of downlink baseband signals to the k antennas in each RRU, respectively, so that each RRU generates downlink radio frequency signals based on the downlink baseband signals and sends the downlink radio frequency signals by using the k antennas.

The third allocating unit 123 is configured to divide antennas in each RRU into k groups, and transmit the k paths of downlink baseband signals to the k groups of antennas in each RRU, respectively, so that each RRU generates downlink radio frequency signals based on the downlink baseband signals and sends the downlink radio frequency signals by using the k groups of antennas.

In an embodiment, the BBU may be used in a distributed system, such as a distributed base station system, a distributed antenna system, or a C-RAN system.

According to the technical solutions in this embodiment of the present invention, when traffic volume in an area among areas covered by multiple RRUs is lower than a preset threshold, a group of downlink baseband signals is generated or received, where the downlink baseband signals correspond to all cells in the area, and the group of downlink baseband signals is transmitted to each RRU in each cell in the area. In this way, bandwidth for transmitting downlink baseband signals is greatly lowered. Further, the group of downlink baseband signals may be generated according to the number of antennas in an RRU that has fewest antennas among all RRUs, thereby further lowering bandwidth for transmitting downlink baseband signals. In addition, implementation is easy, and complexity of a system is reduced.

Figure 10:
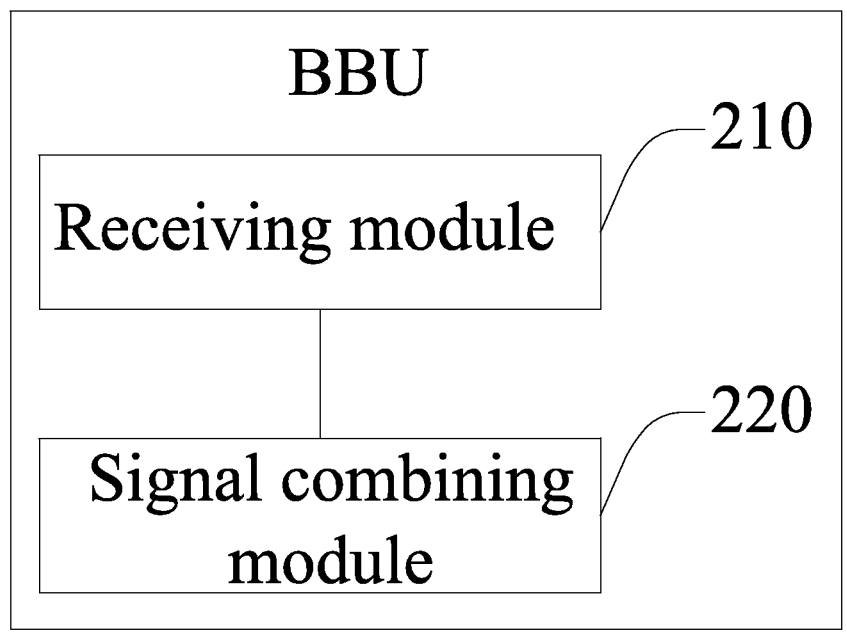
FIG. 10 is a schematic structural diagram of a BBU according to an embodiment of the present invention.

As shown in FIG. 10, an embodiment of the present invention provides a BBU, including: a receiving module 210 configured to receive uplink baseband signals transmitted by each RRU in an area among areas covered by multiple RRUs corresponding to the BBU, where the uplink baseband signals transmitted by each RRU are obtained by converting received radio frequency signals by each RRU; and a signal combining module 220 configured to: when uplink traffic volume in the area is lower than a preset threshold, combine the uplink baseband signals transmitted by each RRU in the area into one group of uplink baseband signals, where the group of uplink baseband signals corresponds to all RRUs in the area.

In an embodiment, the receiving module 210 is specifically configured to: receive k paths of uplink baseband signals transmitted by each RRU in the area by using its respective k antennas or k groups of antennas, where the k paths of uplink baseband signals transmitted by each RRU are obtained by converting k paths of radio frequency signals received by each RRU by using its respective k antennas or k groups of antennas; the k is a natural number and indicates the number of antennas in an RRU that has fewest antennas among all RRUs in all cells.

In an embodiment, the signal combining module 220 is specifically configured to: receive k paths of uplink baseband signals transmitted by each RRU in the area by using its respective k antennas or k groups of antennas, where the k paths of uplink baseband signals transmitted by each RRU are obtained by converting k paths of radio frequency signals received by each RRU by using its respective k antennas or k groups of antennas; the k is a natural number and indicates the number of antennas in an RRU that has fewest antennas among all RRUs in all cells.

Figure 11A:
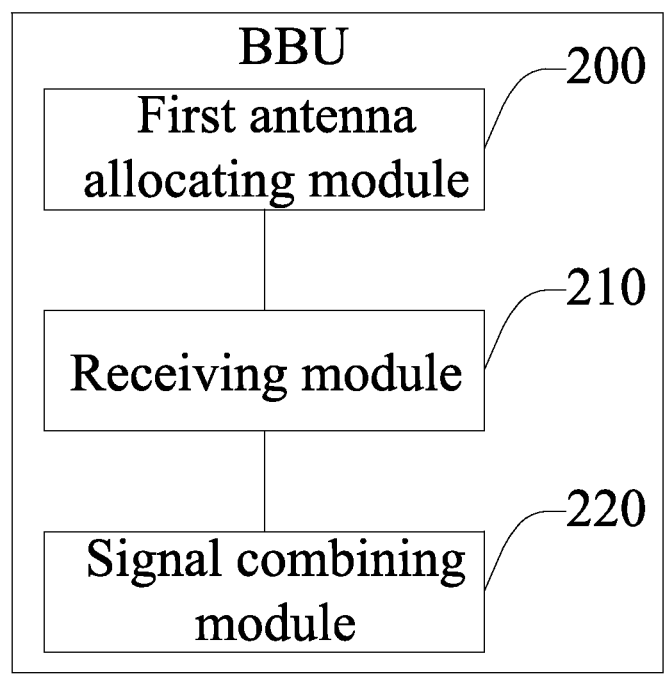
FIG. 11a is a schematic structural diagram of a BBU according to an embodiment of the present invention.
Figure 11B:
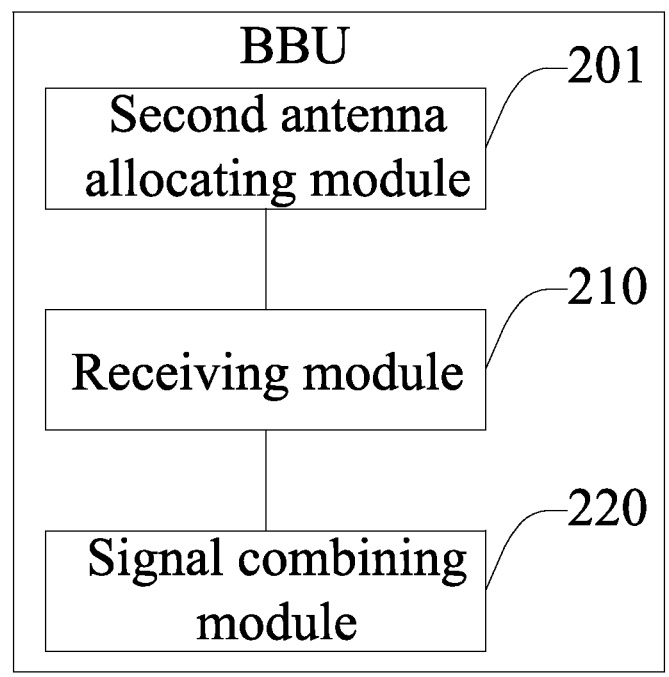
FIG. 11b is a schematic structural diagram of a BBU according to an embodiment of the present invention.
Figure 11C:
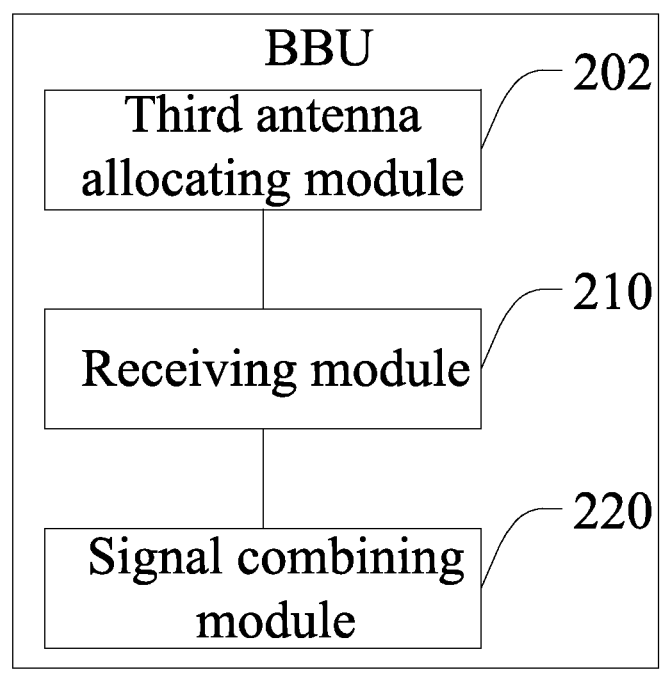
FIG. 11c is a schematic structural diagram of a BBU according to an embodiment of the present invention.

In an embodiment, as shown in FIG. 11a to FIG. 11c, the BBU may further include: a first antenna allocating module 200, a second antenna allocating module 201, or a third antenna allocating module 202, where:

The first antenna allocating module 200 is configured to: for each RRU, fixedly select any k antennas among all antennas in each RRU, so that each RRU receives the k paths of radio frequency signals by using the k antennas, respectively.

The second antenna allocating module 201 is configured to: for each RRU, select any k antennas among all antennas in each RRU at a preset interval, so that each RRU receives the k paths of radio frequency signals by using the k antennas, respectively.

The third antenna allocating module 202 is configured to: for each RRU, divide antennas in each RRU into k groups, so that each RRU receives the k paths of radio frequency signals by using the k groups of antennas, respectively.

In an embodiment, the BBU may be used in a distributed system, such as a distributed base station system, a distributed antenna system, or a C-RAN system.

According to the technical solutions in this embodiment of the present invention, when uplink traffic volume in an area among areas covered by multiple RRUs is lower than a preset threshold, the uplink baseband signals transmitted by each RRU in the area are combined into one group of uplink baseband signals, and the group of uplink baseband signals corresponds to all cells in the area. In this way, the bandwidth for transmitting uplink baseband signals is greatly lowered, the implementation is easy, and complexity of a system is reduced. Further, the uplink baseband signals transmitted by each RRU are transmitted by using the minimum number of antennas or antenna group selected by the BBU, and the group of uplink baseband signals obtained by combining the uplink baseband signals is transmitted by using the minimum number of antennas or antenna group selected, thereby further lowering the bandwidth for transmitting uplink baseband signals.

Figure 12:
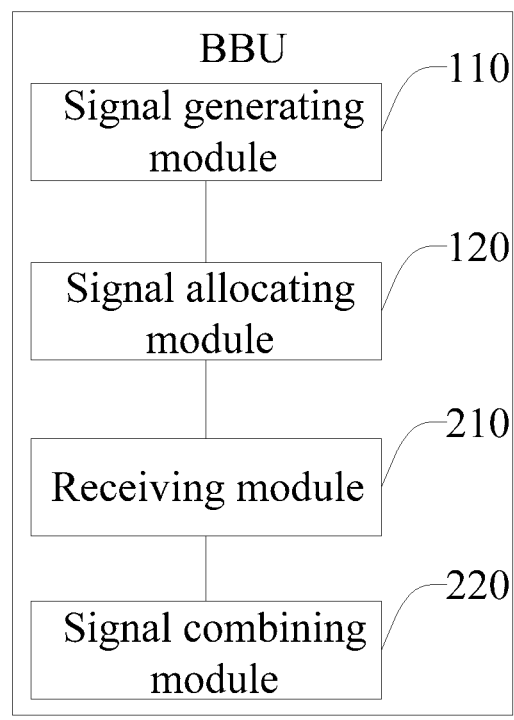
FIG. 12 is a schematic structural diagram of a BBU according to an embodiment of the present invention.

As shown in FIG. 12, an embodiment of the present invention provides a BBU, including: a signal generating module 110 configured to: when downlink traffic volume in an area among areas covered by multiple RRUs is lower than a preset threshold, generate or receive a group of downlink baseband signals, where the group of downlink baseband signals corresponds to all RRUs in the area; a signal allocating module 120 configured to transmit the group of downlink baseband signals to each RRU in the area, so that each RRU generates downlink radio frequency signals based on the downlink baseband signals and sends the downlink radio frequency signals; a receiving module 210 configured to receive uplink baseband signals transmitted by each RRU in an area among areas covered by multiple RRUs corresponding to the BBU, where the uplink baseband signals transmitted by each RRU are obtained by converting received radio frequency signals by each RRU; and a signal combining module 220 configured to: when uplink traffic volume in the area is lower than a preset threshold, combine the uplink baseband signals transmitted by each RRU in the area into one group of uplink baseband signals, where the group of uplink baseband signals corresponds to all RRUs in the area.

In this embodiment, the specific structure and functions of each module are already described in detail in the preceding apparatus embodiment, and are not described herein.

In an embodiment, the BBU may be used in a distributed system, such as a distributed base station system, a distributed antenna system, or a C-RAN system.

According to the technical solutions provided in the embodiments of the present invention, in a downlink direction, when traffic volume in an area among areas covered by multiple RRUs is lower than a preset threshold, a group of downlink baseband signals is generated for the area, where the downlink baseband signals correspond to all RRUs in the area, and the group of downlink baseband signals is transmitted to each RRU in each cell in the area; or, in an uplink direction, when traffic volume in an area among areas covered by multiple RRUs is lower than a preset threshold, the uplink baseband signals of each RRU in the area are combined into a group of uplink baseband signals, where the uplink baseband signals correspond to all cells in the area. In this way, the bandwidth for transmitting baseband signals is greatly lowered, implementation is easy, and complexity of a system is reduced.

Figure 13:
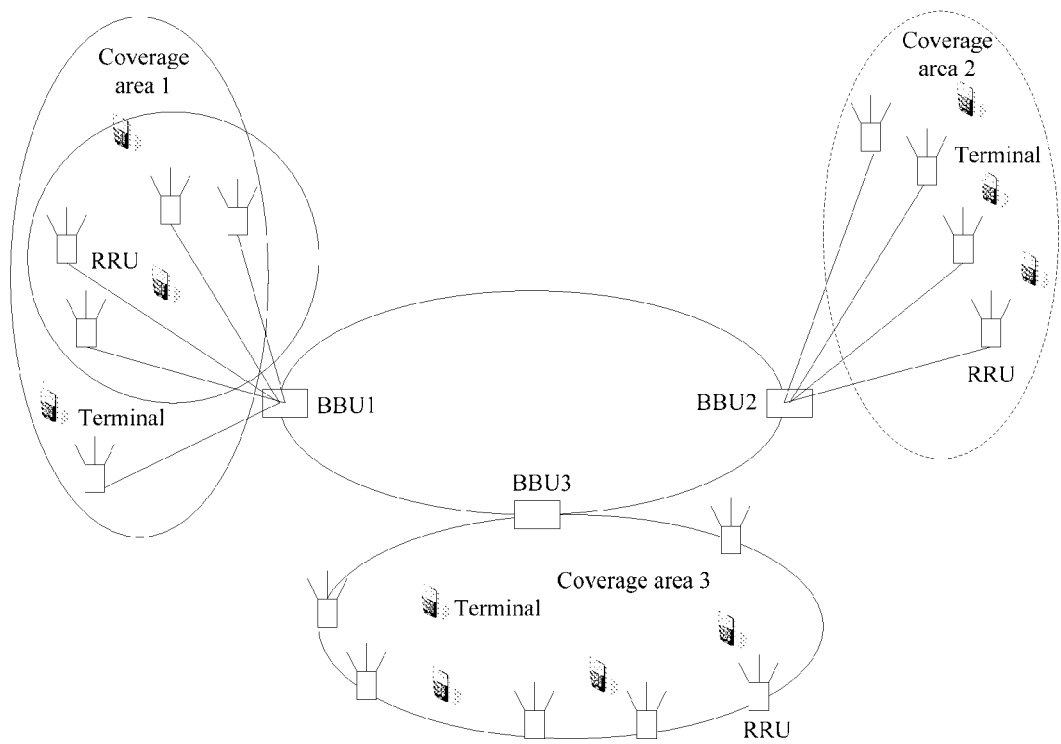
FIG. 13 is a schematic diagram of a system for transmitting baseband signals according to an embodiment of the present invention.

As shown in FIG. 13, this embodiment of the present invention provides a system for transmitting baseband signals, including at least one BBU node (for example, BBU 1, BBU 2, and BBU 3 in FIG. 13), and areas covered by multiple RRUs corresponding to the at least one BBU node (for example, coverage area 1, coverage area 2, and coverage area 3 in FIG. 13).

The BBU is configured to: when downlink traffic volume in an area among areas covered by multiple RRUs is lower than a preset threshold, generate or receive a group of downlink baseband signals, where the group of downlink baseband signals corresponds to all RRUs in the area; transmit the group of downlink baseband signals to each RRU in the area; receive uplink baseband signals transmitted by each RRU in an area among areas covered by corresponding multiple RRUs, where the uplink baseband signals transmitted by each RRU are obtained by converting received radio frequency signals by each RRU; and when uplink traffic volume in the area is lower than a preset threshold, combine the uplink baseband signals transmitted by each RRU in the area into one group of uplink baseband signals, where the group of uplink baseband signals corresponds to all RRUs in the area.

The RRUs in the areas covered by the multiple RRUs are configured to: receive downlink baseband signals transmitted by the BBU, generate downlink radio frequency signals based on the downlink baseband signals, and send the generated downlink radio frequency signals; convert received radio frequency signals into uplink baseband signals and transmit the uplink baseband signals to the BBU.

In an embodiment as shown in FIG. 13, each of the RRUs in the covered areas may receive radio frequency signals of a terminal in each of the covered areas through an air interface.

In an embodiment, the BBU may be connected to the areas covered by the corresponding multiple RRUs through a ring connection or through a star connection. As shown in FIG. 13, BBU 1 and BBU 2 are connected to the corresponding coverage area 1 and coverage area 2 through a star connection, respectively, and BBU 3 is connected to the corresponding coverage area 3 through a ring connection.

Specifically, in a downlink direction, in an embodiment, when downlink traffic volume in a certain area (as indicated by a circle in FIG. 13) in the coverage area 1 corresponding to BBU 1 is lower than a preset threshold, BBU 1 generates a group of downlink baseband signals, where the group of downlink baseband signals corresponds to all RRUs (that is, four RRUs in the circle in FIG. 13) in the certain area (as indicated by the circle in FIG. 13).

Of course, in another embodiment, when downlink traffic volume in a certain area (as indicated by a circle in FIG. 13) in the coverage area 1 corresponding to BBU 1 is lower than a preset threshold, BBU 2 (or BBU 3) may also generate this group of downlink baseband signals in place of BBU 1. In this case, BBU 1 sends indication information to BBU 2, where the indication information is used to inform BBU 2 that the downlink traffic volume in the area in the coverage area 1 is lower than the preset threshold; after receiving the indication information, BBU 2 generates a group of downlink baseband signals, where the downlink baseband signals correspond to all RRUs in the area in the coverage area 1. BBU 2 transmits the group of generated downlink baseband signals to BBU 1. After receiving the group of downlink baseband signals transmitted by BBU 2, BBU 1 transmits the group of downlink baseband signals to RRUs (that is, four RRUs in the circle in FIG. 13) in the area.

The specific structure and functions of the BBU are already described in detail in the preceding apparatus embodiment, and are not described herein.

According to the technical solutions provided in the embodiments of the present invention, in a downlink direction, when traffic volume in an area among areas covered by multiple RRUs is lower than a preset threshold, a group of downlink baseband signals is generated for the area, where the downlink baseband signals corresponds to all RRUs in the area, and the group of downlink baseband signals is transmitted to each RRU in each cell in the area; or, in an uplink direction, when traffic volume in an area among areas covered by multiple RRUs is lower than a preset threshold, the uplink baseband signals of each RRU in the area are combined into a group of uplink baseband signals, where the uplink baseband signals correspond to all cells in the area. In this way, bandwidth for transmitting baseband signals is greatly lowered, implementation is easy, and complexity of a system is reduced.

Figure 14:
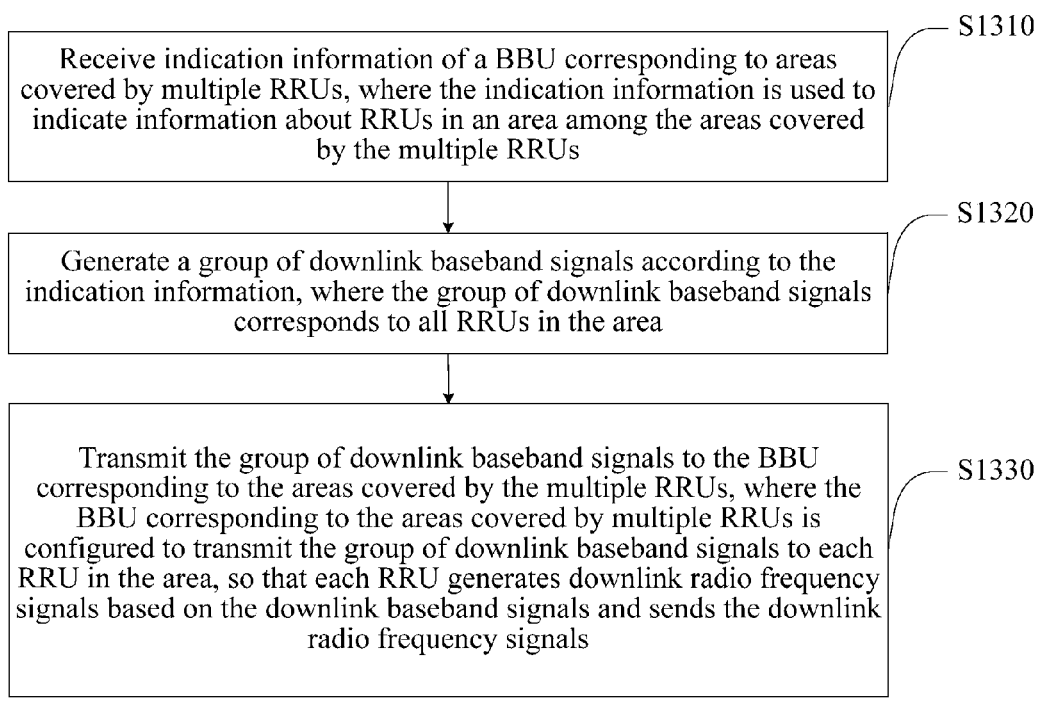
FIG. 14 is a flow chart of a method for transmitting baseband signals according to an embodiment of the present invention.

As shown in FIG. 14, an embodiment of the present invention provides a method for transmitting baseband signals. The method includes the following steps:

S1310: Receive indication information of a BBU corresponding to areas covered by multiple RRUs, where the indication information is used to indicate information about RRUs in an area among the areas covered by the multiple RRUs.

In an embodiment, the indication information is sent by the BBU corresponding to the areas covered by the multiple RRUs, when downlink traffic volume in the area is lower than a preset threshold.

In an embodiment, the information about the RRUs in the area includes information, such as the number of RRUs, and the number of antennas in an RRU that has the fewest antennas among all RRUs.

S1320: Generate a group of downlink baseband signals according to the indication information, where the group of downlink baseband signals corresponds to all RRUs in the area.

In an embodiment, this group of downlink baseband signals may be generated according to the number of antennas in an RRU that has the fewest antennas among all RRUs in the area. The specific method is already described in detail in the preceding embodiments, and is not described herein.

S1330: Transmit the group of downlink baseband signals to the BBU corresponding to the areas covered by the multiple RRUs, where the BBU corresponding to the areas covered by the multiple RRUs is configured to transmit the group of downlink baseband signals to each RRU in the area, so that each RRU generates downlink radio frequency signals based on the downlink baseband signals and sends the downlink radio frequency signals.

The specific transmission method with which the BBU corresponding to the areas covered by the multiple RRUs is configured to transmit the group of downlink baseband signals to each RRU in the area is already described in detail in the preceding embodiments, and is not described herein.

According to the technical solutions in this embodiment of the present invention, when traffic volume in an area among areas covered by multiple RRUs is lower than a preset threshold, only one group of downlink baseband signals is generated for this area, where the downlink baseband signals correspond to all cells in the area, and the group of downlink baseband signals is transmitted to each RRU in each cell in the area. In this way, bandwidth for transmitting downlink baseband signals is greatly lowered, implementation is easy, and complexity of a system is reduced.

Figure 15:
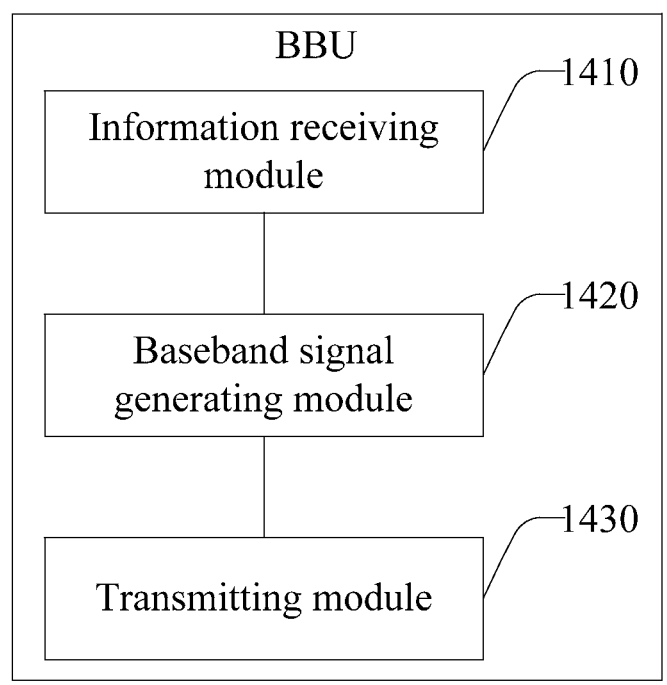
FIG. 15 is a schematic structural diagram of a BBU according to an embodiment of the present invention.

As shown in FIG. 15, an embodiment of the present invention provides a BBU, including: an information receiving module 1410, a baseband signal generating module 1420, and a transmitting module 1430. The information receiving module 1410 is configured to receive indication information of a BBU corresponding to areas covered by multiple RRUs, where the indication information is used to indicate information about RRUs in an area among the areas covered by the multiple RRUs.

In an embodiment, the indication information is sent by the BBU corresponding to the areas covered by the multiple RRUs, when downlink traffic volume in the area is lower than a preset threshold.

In an embodiment, the information about the RRUs in the area includes information, such as the number of RRUs, and the number of antennas in an RRU that has fewest antennas among all RRUs.

The baseband signal generating module 1420 is configured to generate a group of downlink baseband signals according to the indication information, where the group of downlink baseband signals corresponds to all RRUs in the area; and in an embodiment, the baseband generating module 1420 may generate this group of downlink baseband signals according to the number of antennas in an RRU that has the fewest antennas among all RRUs in the area. The specific method is already described in detail in the preceding embodiments, and is not described herein.

The transmitting module 1430 is configured to transmit the group of downlink baseband signals to the BBU corresponding to the areas covered by the multiple RRUs, where the BBU corresponding to the areas covered by the multiple RRUs is configured to transmit the group of downlink baseband signals to each RRU in the area, so that each RRU generates downlink radio frequency signals based on the downlink baseband signals and sends the downlink radio frequency signals.

The specific transmission method with which the BBU corresponding to the areas covered by the multiple RRUs is configured to transmit the group of downlink baseband signals to each RRU in the area is already described in detail in the preceding embodiments, and is not described herein.

According to the technical solutions in this embodiment of the present invention, when traffic volume in an area among areas covered by multiple RRUs is lower than a preset threshold, only one group of downlink baseband signals is generated for this area, where the downlink baseband signals correspond to all cells in the area, and the group of downlink baseband signals is transmitted to each RRU in each cell in the area. In this way, bandwidth for transmitting downlink baseband signals is greatly lowered, implementation is easy, and complexity of a system is reduced.

Persons of ordinary skill in the art should understand that all or a part of the steps of the method according to the embodiments may be implemented by a computer program instructing relevant hardware. The program may be stored in a computer readable storage medium. When the program is run, the steps of the method according to the embodiments are included. The storage medium may be a magnetic disk, an optical disk, a read-only memory (ROM), or a random access memory (RAM).

The above are merely exemplary embodiments of the present invention. Persons skilled in the prior art can make various modifications or variations based on the disclosed content of the application without departing from the idea and scope of the present invention.

What is claimed is:

1. A method for transmitting baseband signals, applied in a distributed system, wherein the distributed system includes multiple baseband units, BBUs, and multiple remote radio frequency units, RRUs, wherein each BBU corresponds to an area covered by multiple RRUs, the method comprising:
generating, by one of the BBUs, one group of downlink baseband signals when downlink traffic volume in an area among areas covered by the RRUs is lower than a preset threshold, wherein the group of downlink baseband signals corresponds to all RRUs in the area; and
transmitting, by a BBU corresponding to the area, the group of downlink baseband signals to each RRU in the area, such that each RRU generates downlink radio frequency signals based on the downlink baseband signals and sends the downlink radio frequency signals;

wherein, the step of generating (S101) the group of downlink baseband signals comprises: generating the group of downlink baseband signals according to the number of antennas in an RRU that has fewest antennas among all RRUs in the area; wherein, the group of downlink baseband signals comprise k paths of downlink baseband signals, and the k is a natural number and indicates the number of antennas in the RRU that has the fewest antennas among all the RRUs.

2. The method for transmitting baseband signals according to claim 1, wherein, the step of generating the group of downlink baseband signals comprises: generating, by the BBU corresponding to the area covered by the multiple RRUs, the group of downlink baseband signals, or, the step of generating (S101) the group of downlink baseband signals comprises: generating, by another BBU in the distributed system, the group of downlink baseband signals; and the method further comprises: receiving, by the BBU corresponding to the area covered by the multiple RRUs, the one group of downlink baseband signals generated and transmitted by the another BBU.

3. The method for transmitting baseband signals according to claim 1, wherein transmitting the group of downlink baseband signals to each RRU in the area comprises:

for each RRU, fixedly selecting any k antennas among all antennas in each RRU, and transmitting the k paths of downlink baseband signals to the k antennas in each RRU, respectively; or, for each RRU, selecting any k antennas among all antennas in each RRU at a preset interval, and transmitting the k paths of downlink baseband signals to the k antennas in each RRU, respectively; or, for each RRU, dividing antennas in each RRU into k groups, and transmitting the k paths of downlink baseband signals to the k groups of antennas in each RRU, respectively.

4. A method for transmitting baseband signals, applied in a distributed system, wherein the distributed system includes multiple baseband units, BBUs, and multiple remote radio frequency units, RRUs, wherein each BBU corresponds to an area covered by multiple RRUs, comprising:

receiving uplink baseband signals transmitted by each RRU in an area among areas covered by corresponding multiple RRUs, by the BBU corresponding to the area, wherein the uplink baseband signals transmitted by each RRU are obtained by converting received radio frequency signals by each RRU; and combining, by the BBU corresponding to the area, the uplink baseband signals transmitted by each RRU in the area into one group of uplink baseband signals when uplink traffic volume in the area is lower than a preset threshold, wherein the group of uplink baseband signals corresponds to all RRUs in the area;

wherein the one group of uplink baseband signals comprise k paths of combined uplink baseband signals, and the k is a natural number and indicates the number of antennas in an RRU that has fewest antennas among all RRUs in the area.

5. The method for transmitting baseband signals according to claim 4, wherein receiving the uplink baseband signals transmitted by each RRU in the area among the areas covered by the corresponding multiple RRUs comprises:

receiving k paths of uplink baseband signals transmitted by each RRU in the area by using its respective k antennas or k groups of antennas, wherein the k paths of uplink baseband signals transmitted by each RRU in the area are obtained by converting k paths of radio frequency signals received by each RRU by using its respective k antennas or k groups of antennas, and wherein k is a natural number and indicates the number of antennas in an RRU that has a fewest antennas among all RRUs.

6. The method for transmitting baseband signals according to claim 5, wherein before receiving the uplink baseband signals transmitted by each RRU in the area among the areas covered by the corresponding multiple RRUs, the method further comprises:

for each RRU, fixedly selecting any k antennas among all antennas in each RRU such that each RRU receives the k paths of radio frequency signals by using the k antennas, respectively; or, for each RRU, selecting any k antennas among all antennas in each RRU at a preset interval such that each RRU receives the k paths of radio frequency signals by using the k antennas, respectively; or, for each RRU, dividing antennas in each RRU into k groups such that each RRU receives the k paths of radio frequency signals by using the k groups of antennas, respectively.

7. The method for transmitting baseband signals according to claim 4, wherein combining the uplink baseband signals transmitted by each RRU in the area into one group of uplink baseband signals comprises combining k paths of uplink baseband signals transmitted by one RRU in the area by using its k antennas or k groups of antennas with k paths of uplink baseband signals transmitted by each of other RRUs in the area by using its respective k antennas or k groups of antennas to obtain the k paths of combined uplink baseband signals.

8. A baseband unit (BBU) for a distributed system, wherein the distributed system includes multiple baseband units, BBUs, and multiple remote radio frequency units, RRUs, wherein each BBU corresponds to an area covered by multiple RRUs, comprising:

a signal generating module configured to generate one group of downlink baseband signals when downlink traffic volume in the area covered by multiple RRUs is lower than a preset threshold, wherein the group of downlink baseband signals corresponds to all RRUs in the area; and a signal allocating module configured to transmit the group of downlink baseband signals wherein the signal generating module comprises:

an acquiring unit configured to acquire the number of antennas in an RRU that has a fewest antennas among all RRUs in the area; and a generating unit configured to generate the group of downlink baseband signals according to the number of antennas in the RRU that has the fewest antennas among all the RRUs, wherein the group of downlink baseband signals comprises k paths of downlink baseband signals, and wherein k is a natural number and indicates the number of antennas in the RRU that has the fewest antennas among all the RRUs.

9. The BBU according to claim 8, wherein the signal allocating module comprises:

a first allocating unit;

a second allocating unit;

or a third allocating unit, wherein the first allocating unit is configured to fixedly select any k antennas among all antennas in each RRU, and transmit the k paths of downlink baseband signals to the k antennas in each RRU such that each RRU generates downlink radio frequency signals based on the downlink baseband signals and sends the downlink radio frequency signals by using the k antennas, wherein the second allocating unit is configured to select any k antennas among all antennas in each RRU at a preset interval, and transmit the k paths of downlink baseband signals to the k antennas in each RRU such that each RRU generates downlink radio frequency signals based on the downlink baseband signals and sends the downlink radio frequency signals by using the k antennas, and wherein the third allocating unit is configured to divide antennas in each RRU into k groups, and transmit the k paths of downlink baseband signals to the k groups of antennas in each RRU such that each RRU generates downlink radio frequency signals based on the downlink baseband signals and sends the downlink radio frequency signals by using the k groups of antennas.

10. The BBU according to claim 8, wherein, when the BBU is a BBU corresponding to the area, the signal allocating module (120) is configured to transmit the group of downlink baseband signals to each RRU in the area, so that each RRU generates downlink radio frequency signals based on the downlink baseband signals and sends the downlink radio frequency signals; or, when the BBU is another BBU in the distributed system, the signal allocating module (120) is configured to transmit the group of downlink baseband signals to the BBU corresponding to the area.

11. A baseband unit (BBU) for a distributed system, wherein the distributed system includes multiple baseband units, BBUs, and multiple remote radio frequency units, RRUs, wherein each BBU corresponds to an area covered by multiple RRUs, comprising:

a receiving module configured to receive uplink baseband signals transmitted by each RRU in an area among areas covered by corresponding multiple RRUs, wherein the uplink baseband signals transmitted by each RRU are obtained by converting received radio frequency signals by each RRU; and a signal combining module configured to combine the uplink baseband signals transmitted by each RRU in the area into one group of uplink baseband signals when uplink traffic volume in the area is lower than a preset threshold, wherein the group of uplink baseband signals corresponds to all RRUs in the area;

wherein the one group of uplink baseband signals comprise k paths of combined uplink baseband signals, and the k is a natural number and indicates the number of antennas in an RRU that has fewest antennas among all RRUs in the area.

12. The BBU according to claim 11, wherein the receiving module is specifically configured to receive k paths of uplink baseband signals transmitted by each RRU in the area by using its respective k antennas or k groups of antennas, wherein the k paths of uplink baseband signals transmitted by each RRU in the area are obtained by converting k paths of radio frequency signals received by each RRU by using its respective k antennas or k groups of antennas, and wherein k is a natural number and indicates the number of antennas in an RRU that has a fewest antennas among all RRUs in all cells.

13. The BBU according to claim 12, wherein the signal combining module is specifically configured to combine the k paths of uplink baseband signals transmitted by one RRU in the area by using its k antennas or k groups of antennas with k paths of uplink baseband signals transmitted by each of other remaining RRUs in the area by using its respective k antennas or k groups of antennas to obtain k paths of combined uplink baseband signals, and wherein the group of uplink baseband signals comprises the k paths of combined uplink baseband signals.

14. The BBU according to claim 12, wherein the BBU further comprises:

a first antenna allocating module;

a second antenna allocating module; or a third antenna allocating module, wherein the first antenna allocating module is configured to, for each RRU, fixedly select any k antennas among all antennas in each RRU such that each RRU receives the k paths of radio frequency signals by using the k antennas, respectively, wherein the second antenna allocating module is configured to, for each RRU, select any k antennas among all antennas in each RRU at a preset interval such that each RRU receives the k paths of radio frequency signals by using the k antennas, respectively, and wherein the third antenna allocating module is configured to, for each RRU, divide antennas in each RRU into k groups such that each RRU receives the k paths of radio frequency signals by using the k groups of antennas, respectively.

* * * * *